(12) United States Patent
Laughlin

(10) Patent No.: US 8,522,292 B2
(45) Date of Patent: Aug. 27, 2013

(54) STREAMING MEDIA BANDWIDTH REDUCTION

(75) Inventor: Chetley T. Laughlin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 149 days.

(21) Appl. No.: 13/161,320

(22) Filed: Jun. 15, 2011

(65) Prior Publication Data

US 2012/0324519 A1    Dec. 20, 2012

(51) Int. Cl.
*H04N 7/173* (2011.01)

(52) U.S. Cl.
USPC .................................. 725/97; 725/93; 725/95

(58) Field of Classification Search
USPC .................. 725/93, 95, 97, 86–89; 370/468, 370/431–462
See application file for complete search history.

(56) References Cited

U.S. PATENT DOCUMENTS

| | | | |
|---|---|---|---|
| 7,072,296 | B2 | 7/2006 | Turner et al. |
| 7,096,271 | B1 | 8/2006 | Omoigui et al. |
| 7,657,668 | B2 | 2/2010 | Escott |
| 7,827,296 | B2 | 11/2010 | Zuckerman et al. |
| 8,312,493 | B2 * | 11/2012 | Azam et al. ..................... 725/97 |
| 2005/0094562 | A1 | 5/2005 | Roy et al. |
| 2008/0263607 | A1 | 10/2008 | Gurevich et al. |
| 2009/0100459 | A1 * | 4/2009 | Riedl et al. ..................... 725/35 |
| 2009/0144784 | A1 * | 6/2009 | Li et al. ........................... 725/97 |
| 2009/0235318 | A1 * | 9/2009 | Amsterdam et al. ............ 725/87 |

OTHER PUBLICATIONS

Siganos et al., "Monitoring the Bittorent Monitors: A bird's eye view," *In Proceedings of PAM*. 2009, pp. 175-184 (2009).
Zhang et al., "NetMedia: Streaming Multimedia Presentations in Distributed Environments," *IEEE Multimedia*, vol. 9, No. 1, pp. 56-73 (2002).

* cited by examiner

*Primary Examiner* — Mulugeta Mengesha
(74) *Attorney, Agent, or Firm* — Klarquist Sparkman, LLP

(57) ABSTRACT

A media server reduces media streaming bandwidth by synchronizing start times of media streams sent to clients requesting a particular set of media or other data. The server starts new streams periodically or when it has received a certain number of requests, resulting in multiple streams delivering the media to multiple clients. The streams can be delivered using multicast technologies. Overall media stream bandwidth is further reduced by merging streams. At some point after a stream has become active, a client receiving data from a current stream has enough media stored locally to ensure smooth playback of the media if the client is switched to a trailing stream. A client can switch to a trailing stream after the speed of the current stream is throttled down and the current stream becomes synchronized with the trailing stream. Multiple streams can be merged simultaneously, and streams can be merged multiple times.

13 Claims, 16 Drawing Sheets

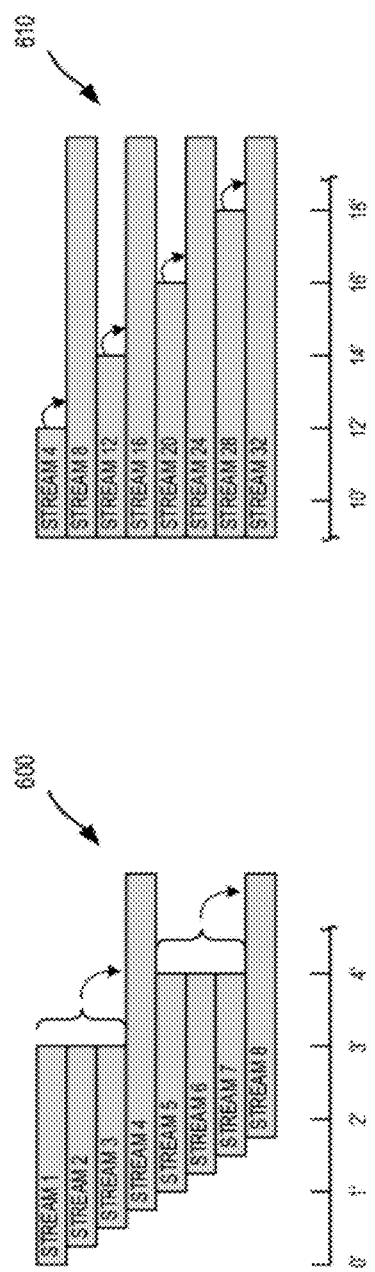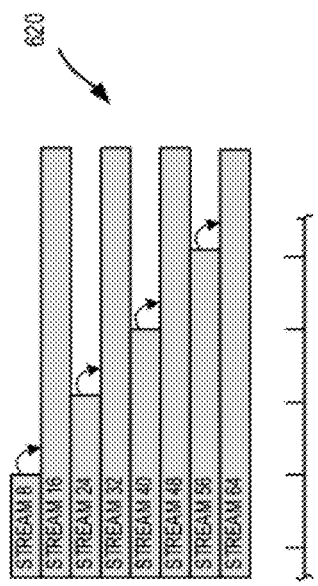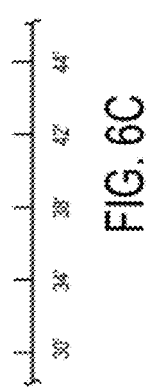
FIG. 6A
FIG. 6B
FIG. 6C

STREAMING MEDIA BANDWIDTH REDUCTION

BACKGROUND

The streaming of media, particularly the streaming of on-demand video, can account for a significant portion of Internet traffic. For example, it has been reported that movies streamed by the on-demand movie service NetFlix® consumed 20% of all Internet traffic in the United States between the hours of 6:00 PM and 9:00 PM during the third quarter of 2010. It is believed that the 20 most popular movies account for more than half of all on-demand daily movie views.

One approach taken by content providers to reduce media streaming bandwidth is to reduce the physical distance that the content travels. To this end, content providers have placed content in multiple physical locations. However, this approach does not reduce network load at the local loop or Internet Service Provider (ISP) segments and can be financially expensive as content libraries grow.

Multicast technologies have been used to stream media from a single source to multiple destinations. Multicast technologies enable the general delivery of content, however, they do not account for the internal structure of content being sent or the environment of applications sending or receiving the content.

Existing multicast technologies include IP (Internet Protocol) multicast, peer-to-peer network protocols, XCAST (Explicit Multi-Unicast), ATM (Asynchronous Transfer Mode) and IRC (Internet Relay Chat). IP multicast provides a single content stream to network switches and routers with a fan-out close to consumers of the content. IP multicast is typically implemented at the IP routing level attempting to route datagrams efficiently. The server sends a data packet once and does not know the number of receivers. User Datagram Protocol (UDP) is one example of a transport protocol used as part of an IP multicast protocol. XCAST is capable of supporting a few hundred clients at a time. Peer-to-peer networks employ a number of different designs for transferring files and take advantage of being able to deliver packets out of order to reduce bandwidth consumption. Other multicast protocols include Ethernet multicasting, P2MP (Point to Multipoint) virtual circuits and Infiniband multicast.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

Methods are disclosed that reduce network bandwidth consumption by providing on-demand movie streaming services with the ability to synchronize media stream start times and merge or collapse media streams after they have started.

In one embodiment, an on-demand movie service aggregates requests for a movie and starts a stream to deliver the movie at periodic intervals. If the service starts a stream every 5 seconds, the number of streams started for a single movie in a day is limited to 17,280 streams, regardless of how many clients request the movie. If the movie is two hours long, the maximum number of streams that the service supports at once is 1,440, setting a limit on the bandwidth consumed by streaming the movie. Bandwidth consumption can be further limited by starting streams at longer intervals such as 10 or 15 seconds.

In another embodiment, a movie service can merge media streams started at different times to further reduce media streaming bandwidth. If a client receives media at a rate faster than it plays back the media, as is often the case, the unplayed media accumulates in local memory and can be played out when switching to receive the movie from a later-started stream. The client plays the movie from local memory during the switchover to avoid disrupting playback of the movie. If no other client remains assigned to the old stream, the movie service can discontinue the old stream. Multiple streams can be merged at once, and streams can be merged multiple times.

The foregoing and other objects, features and advantages of the invention will become more apparent from the following Detailed Description, which proceeds with reference to the accompanying figures.

BRIEF DESCRIPTION OF THE DRAWINGS

FIGS. 6A-6C are timing diagrams illustrating exemplary merging of multiple streams and multiple merge stages.

DETAILED DESCRIPTION

As used herein, a client refers to any computing device as described herein or an application running on such a computing device. For example, a client can be an application or service providing the ability to play a movie, listen to a radio station, a song or a library of songs, conduct or participate in a video or audio conference call, receive files or the like.

As used herein, a stream is a logical construct that identifies a sequence of data to be sent. The data can be media or any other content and thus a stream can be referred to as a data stream, content stream or media stream. Streaming refers to the delivery of a stream over a network that is, at least in part, received and played back by a computing device while being concurrently delivered by a data provider.

Consider, for example, an on-demand media service receiving numerous requests for the latest popular movie that has just been made available on-line. Using the tools and technologies described herein the media service can reduce the overall amount of bandwidth used to deliver the movie to requesting clients. Rather than starting a stream for each client, the service can start streams on a periodic basis to accommodate requests received within each time period. After clients have enough of the movie stored locally, they can be switched from a current stream to a trailing stream. If a current stream is no longer being received by any clients, the current stream can be terminated.

Figure 1:
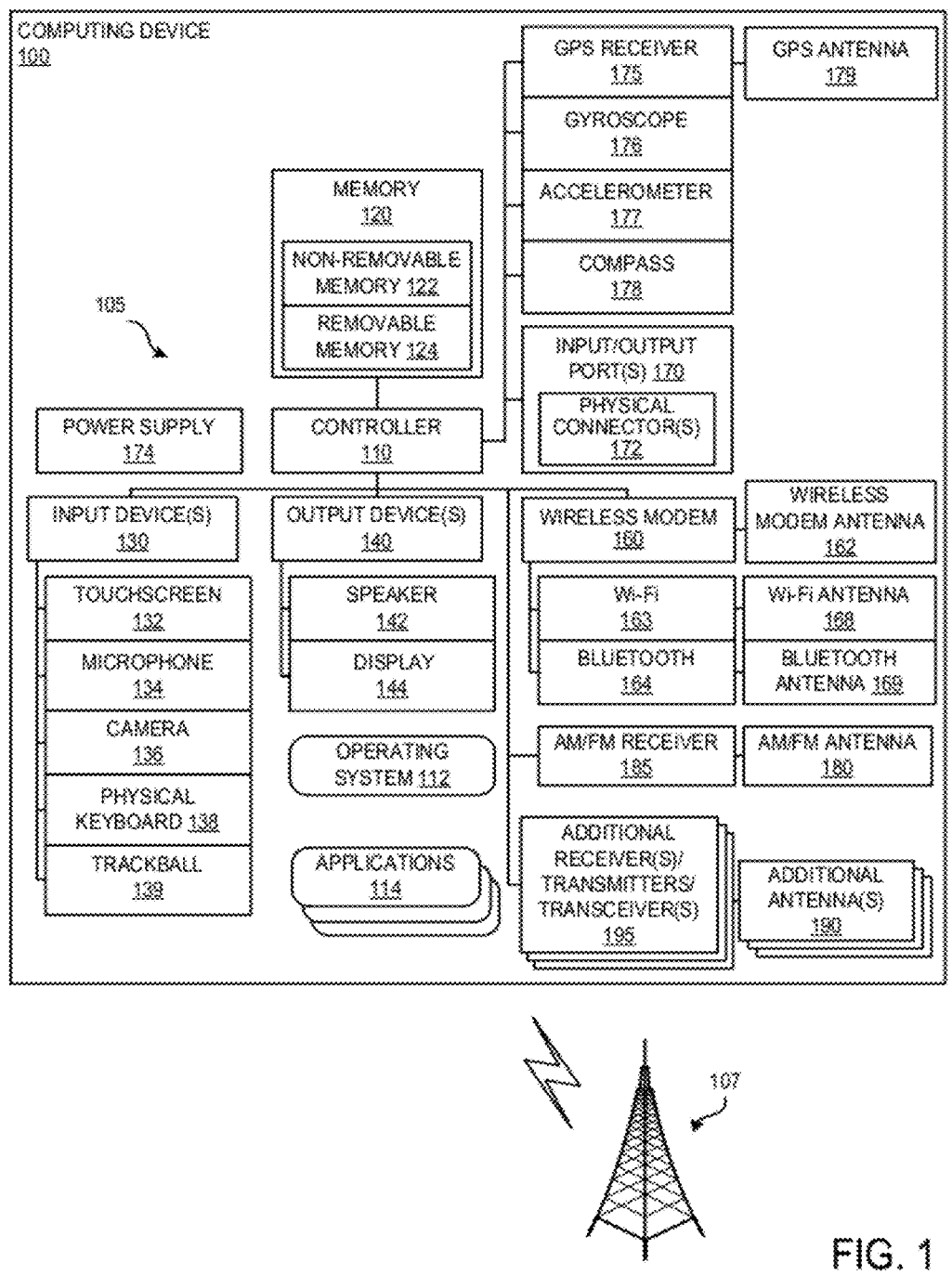
FIG. 1 is a system diagram depicting an exemplary computing device in which described embodiments, techniques, and technologies can be implemented.

FIG. 1 is a system diagram depicting an exemplary computing device 100 that can be used to perform any of the methods described herein. Generally, components 105 in the computing device 100 can communicate with other components, although not all connections are shown, for ease of illustration. The computing device 100 can include a variety of optional hardware and software components 105. The computing device 100 can be any of a variety of computing devices including mobile (e.g., cell phone, smartphone, handheld computer, netbook, tablet computer, slate computer, Personal Digital Assistant (PDA)) and non-mobile (e.g., desktop computers, content servers) computing devices and can allow wired or wireless communication with one or more networks, such as a wireless cellular or satellite network 107.

The illustrated computing device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, power control, and/or other functions. An operating system 112 can control the allocation and usage of the components 105 and support for one or more application programs 114. The application programs can include server applications, media playback applications or any other computing applications that implement one or more methods described herein.

The illustrated computing device 100 can include memory 120. Memory 120 can include non-removable memory 122 and removable memory 124. The non-removable, or embedded memory, 122 can include RAM, ROM, flash memory, a hard drive, or other well-known memory storage technologies. The removable memory 124 can include flash memory cards (e.g., SD (Secure Digital) cards), memory sticks, a Subscriber Identity Module (SIM) card, which is well known in GSM (Global System for Mobile Communication) systems, or other well-known memory storage technologies, such as "smart cards." The memory 120 can be used for storing data and/or computer-executable instructions for running the operating system 112 and the applications 114. Example data can include web pages, text, images, sound files, video data or other data sets to be sent to and/or received from one or more network servers or other devices by the computing device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The computing device 100 can also have access to external memory (not shown) such as external hard drives.

The computing device 100 can support one or more input devices 130, such as a touch screen 132, microphone 134, camera 136, physical keyboard 138 and/or trackball 139 and one or more output devices 140, such as a speaker 142, and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the computing device 100 via a wired or wireless connection. Some devices can serve more than one input/output function. For example, touchscreen 132 and display 144 can be combined in a single input/output device.

The computing device 100 can provide one or more natural user interfaces. For example, the operating system 112 or applications 114 can comprise speech-recognition software as part of a voice user interface that allows the computing device 100 to respond to voice commands. Further, the device 100 can comprise an input device and software that allows the device 100 to respond to spatial gestures made by a user. For example, a user's spatial gestures can be detected and interpreted by the device 100 to provide input to a gaming application.

A wireless modem 160 can be coupled to a wireless modem antenna 162 and can support two-way communications between the computing device 100 and external devices, as is understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the computing device and a public switched telephone network (PSTN).

The computing device 100 can further include at least one input/output port 170 (which can be, for example, a USB port, IEEE 1394 (FireWire) port, and/or RS-232 port) comprising physical connectors 172 and a power supply 174. The mobile computing device can comprise a satellite navigation system receiver such as a GPS receiver 175, a gyroscope 176, an accelerometer 177 and a compass 178. The GPS receiver 175 can be coupled to a GPS antenna 179. The computing device 100 can additionally include an AM/FM antenna 180 coupled to an AM/FM receiver 185 for receiving radio signals broadcast by an AM/FM radio signal transmitter. The computing device 100 can further include one or more additional antennas 190 coupled to one or more additional receivers, transmitters and/or transceivers 195 to enable various additional functions. For example, computing device 100 can include an additional antenna 190 coupled to an additional receiver 195 configured to receive and process a digital audio radio service (DARS) signal for output at the computing device 100 or an attached accessory.

The illustrated components 105 are not required or all-inclusive, as any components can be deleted and other components can be added.

Figure 2:
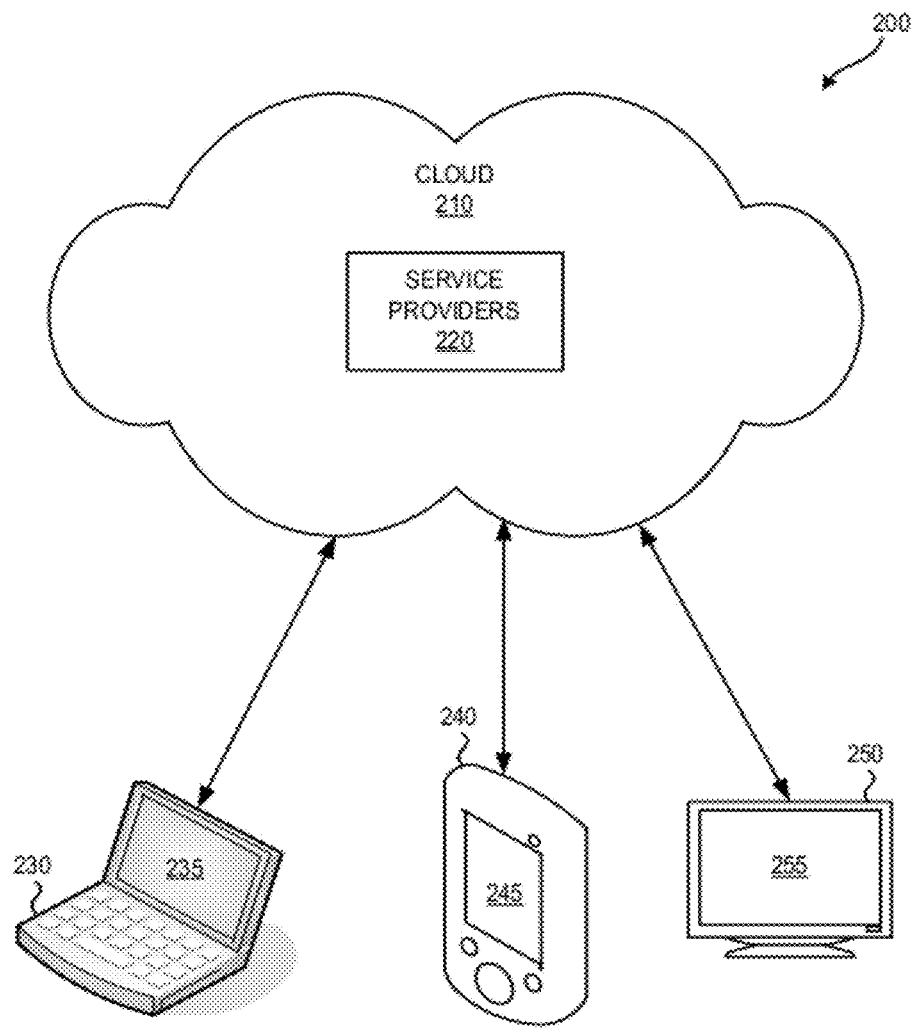
FIG. 2 illustrates a generalized example of a suitable implementation environment in which described embodiments, techniques, and technologies can be implemented.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., media playback) can be performed on local computing devices (e.g., connected devices 230, 240, 250) while other tasks (e.g., distribution of on-demand media) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a computing device with a computing device screen 245 (e.g., a small-size screen). For example, connected device 240 could be a mobile phone, smart phone, personal digital assistant or the like. Connected device 250 represents a device with a large screen 255. For example, connected device 250 could be a television with Internet connectivity, or a television connected to another device capable of connecting to the cloud such as a set-top box, gaming console or the like. One or more of the connected devices 230, 240, 250 can include touch screen capabilities. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, on-demand streaming of media content or other data, email, Short Message Service (SMS), Multimedia Message Service (MMS), social networking and website hosting. The service providers can host online marketplaces offering wide varieties of goods and services such as software applications and upgrades and on-demand media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

The connected devices 230, 240, 250 can act as clients that request media from a data service. The data service can be cloud-based. The data service can stream media such as images, audio, videos and libraries thereof, or any other type of data to a requesting client on an on-demand or scheduled basis. The data service can comprise one or more data servers (media servers). Typically, a stream is identified, determined and managed for a data server by one or more stream attributes. The data server creates streams, and streams exist as long as the data server uses them (i.e., at least one client is receiving via the stream). A stream can have one or more of the following attributes: the file name or other naming qualifier of the data being delivered (e.g., movie name, song name), the stream bit rate and the current packet of the data being sent (i.e., the position of the packet within the stream). The data server can generate a file name based on the data supported by the data server. For example, movie titles can have a year and other data attached as a suffix to generate a file name. Additional stream attributes in some implementations include the resolution of the file (e.g., if video or an image, the display resolution), the audio quality of the file (e.g., kilobytes per second) and parameters specific to the protocol format of the data being streamed.

A data server manages the creation, starting, stopping and deletion of streams as well as adding clients to and removing clients from streams. The data server can use any of the methods described herein to manage and provide the services described while utilizing a lower level protocol (e.g., IP multicast, XCAST) to perform the mechanics of setting up and tearing down a multicast stream. The data server uses such mechanisms to do the actual sending of data streams to clients and associated particulars, such as determining explicit command names, creating data structures, managing packet flow and error control to start, control, and stop a multicast stream on the network as is known in the art.

A download client receives requested data from a data server via a data stream. The download client sends requests and responds to data server requests. For example, a client can request to be added to a stream or dropped from a stream. The download client relies on a lower level protocol (e.g., IP multicast, XCAST) to perform the lower level mechanics of receiving a data stream. A download client determines what data is in the data server catalog and available for download according to methods known in the art. In addition, the download client connects to the data server using methods known in the art. In one embodiment, the download client uses DNS (Domain Name System) to look up the data server that allows the client to be connected to a server located physically nearby from among data servers providing the data catalog.

Figure 3:
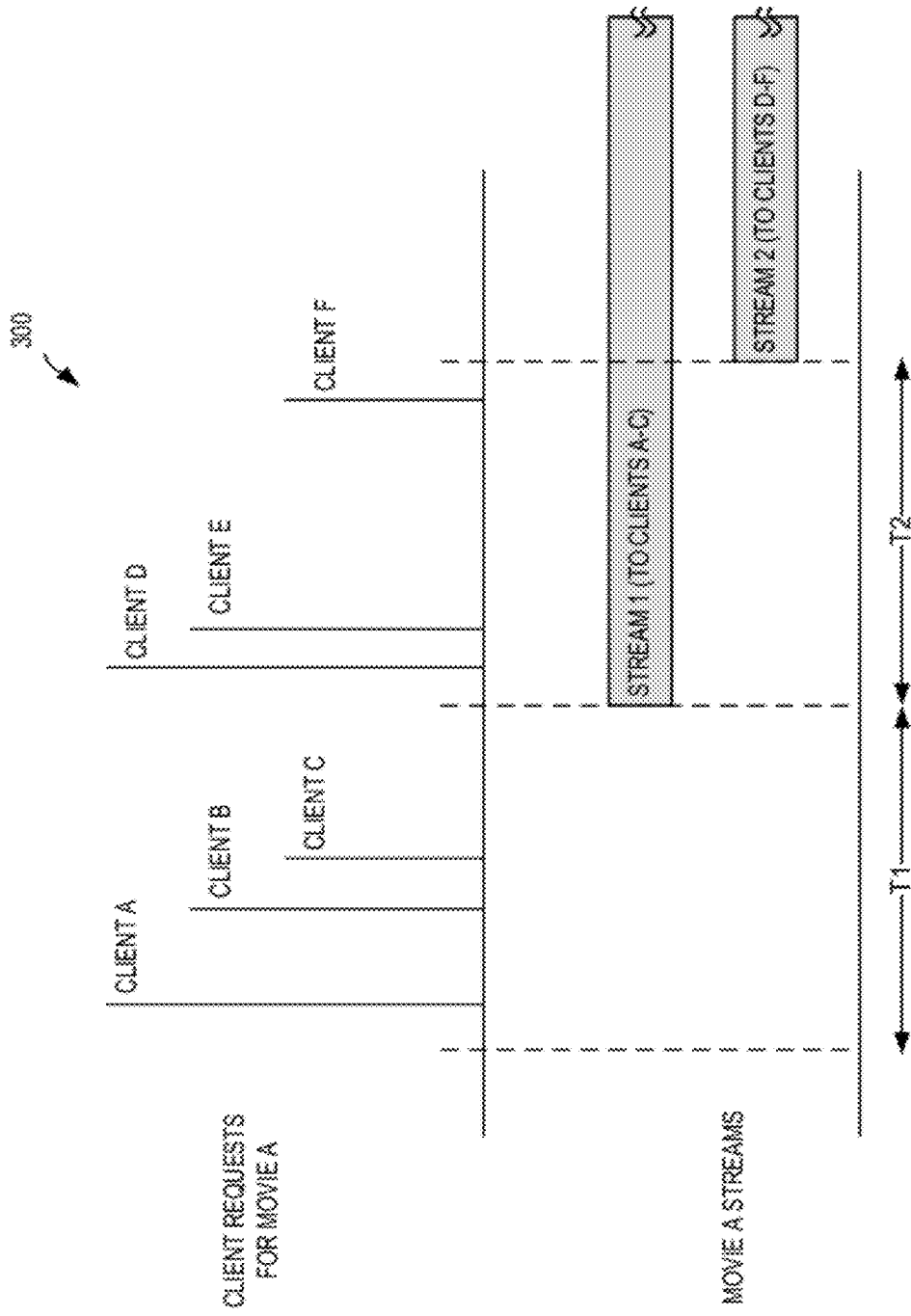
FIG. 3 is a timing diagram illustrating an exemplary synchronization of media stream start times.

FIG. 3 is a timing diagram 300 illustrating an exemplary synchronization of media stream start times. Stream start time synchronization provides a media service with an alternative to starting a new media stream each time the service receives a request for a particular media. Start time synchronization aggregates requests for a particular media received within a given time interval as a batch and delivers the requested media to the requesting clients via a single stream. The timing diagram 300 shows clients A-C requesting the same movie, movie A, during a first time interval T1 from an on-demand movie service. As the service receives the requests, it builds a wait list containing streams that have not been started but that are to be created and started after stream-starting criteria is met. In this example, the service aggregates requests for movie A by adding a new stream to the wait list during interval T1 when a first request for movie A is received (from client A) and adds additional clients to the new stream as it receives further requests for movie A (from clients B and C) during interval T1. The stream-starting criteria is the expiration of time interval T1; the service starts the waitlisted stream at the end of T1 or shortly thereafter. Thus, the requests for movie A from clients A-C are aggregated as a batch, the batch being serviced upon the waitlisted stream being started. In embodiments employing IP multicast as the multicast protocol, starting the movie A media stream can comprise the service informing clients A-C the group address of stream 1. When clients A-C inform the network that they wish to receive packets sent to that group address, the server begins the streaming of stream 1.

In example implementations (described more fully with reference to FIGS. 8A-8E and 9A-9C), a client data request can be handled by a data server as a Client New Stream event. The client provides information identifying the requested media and the server determines which stream to assign to the request. If the request is for a movie or a song, the request can include the position within the movie or song at which the client wishes to begin receiving the media. The server can assign a stream that has already been generated in response to a request received earlier in the current time interval (i.e., a stream that is in the wait list) or received in a previous time period (i.e., a stream that is already being multicast), or the server can initiate a new stream in response to the request (i.e., add a new stream to the wait list).

The server can determine which stream to match to a client based on additional information supplied in the request, such as client identifying information and based on technical or business rule considerations. For example, the server can be configured to organize clients into multiple streams to account for and work around limits in the underlying multicast technologies when supporting large numbers of clients. If the server cannot match a media request to an existing stream or create a new stream to service the request, the server can deny the request or request the client to choose other media. In some embodiments, the client can send an ordered list of media in the initial request.

In the example implementations, streams in the wait list are activated in response to a Stream Start request. A Stream Start request can be made in response to, for example, a time interval expiring (i.e., in response to a Start Stream Interval event as described below) or a number of media requests in the interval meeting a request threshold. When a stream becomes active, the underlying multicast protocol layer is notified to setup the data stream and begin sending the data. The server provides the multicast protocol layer with information that is used to start the data stream. The clients may be notified that the data stream is inbound at this point. This notification can occur at the underlying multicast protocol level.

In the example implementations, after one time interval expires, a following time interval can begin. The following time interval can start in response to a Start Stream Interval Event and need not start immediately after the previous interval ends. A server can indicate that the next interval is to start X seconds into the future, that intervals are set to expire on a periodic basis (e.g., every 10, 15, 30 or 60 seconds), or define another metric to organize the start of streams. In one embodiment, a Start Stream Interval event can indicate that a stream is to start X seconds from the receipt of a first request for a particular media. This gives time for the server to receive requests from other clients desiring the same media, while limiting the amount of time the first client waits for the stream to start. In another embodiment, the Start Stream Interval can indicate that streams are to be started periodically. In this case, a repeating timer can be used to trigger the activation of streams. In yet another embodiment, the Start Stream Interval event can indicate that streams are to be started after X clients request the same media. This can reduce the number of active streams, but can cause a client to wait a longer time for a stream to start.

Returning to FIG. 3, during a second time interval T2, the service receives three more requests for movie A from clients D-F and aggregates these requests as another batch. At the end of the interval T2, the service initiates stream 2 to service the second batch, and initiates delivery of movie A to clients D-F. Thus, instead of initiating six streams to deliver movie A to clients A-F, only two media streams are active and media streaming bandwidth consumption is reduced.

The stream start time synchronization illustrated in FIG. 3 can be extended to any number of requests for a particular media made by any number of clients. For example, additional requests for movie A by multiple clients can be batched in later time intervals, and the service can initiate new streams to service the additional batches that deliver movie A to the newly requesting clients at the end of each time interval. Accordingly, at any moment, the service can be concurrently streaming movie A to any number of requesting clients via multiple streams.

In some embodiments, the media server leverages an existing multicast technology such as IP multicast technology. In IP multicast technology, the media server does not need to know the identities of the requesting clients. Thus, it may not be necessary that the media server be notified of or keep track of the identities of requesting clients. The media server only receives a media request that is made. However, in some embodiments, the media server keeps track of the number of clients receiving media in order to determine when it can cease streaming a particular media stream.

In some embodiments, the start time synchronization is performed for only selected media, such as popular media. Popular media can be, for example, media that is the most requested media over the most recent hour, day, week or other time period. For example, a media service can apply start time synchronization to requests for the top 20 movies requested over the past week. In other embodiments, popular media can be media that is requested above a given request threshold. For example, time synchronization can be applied to movies that have been requested at a rate of at least 100 requests an hour or more. In addition, a media service can elect to employ start time synchronization based on other criteria such as the time of day or geographical location of requesting clients. For example, start time synchronization can be employed during time periods when Internet traffic is known to be greatest (e.g., weekday evenings) or in geographical areas where Internet traffic is known to be relatively high.

The duration of a fixed time interval can be selected to achieve a desired balance between reducing the number of active streams and reducing the time a user spends waiting for a stream to start. For example, a media service can be configured to start a media stream every 15 seconds for a particular media, the operators of the service deciding that 15 seconds is the longest they want a user to wait before a requested movie begins playing. The longer the time interval, the greater the amount of bandwidth reduction. For example, if a new stream for a particular two-hour movie is started every 5, 10 or 15 seconds, the media service can at most be streaming 1440, 720 or 480 unique streams for the movie at any given time. If the number of requests received in a time interval does not meet a request threshold, the service can continue to count the requests over successive time intervals until the request threshold is reached. In some embodiments, the time interval is variable and changes depending on the number of requests received; a service can be configured to initiate a new stream only when the number of requests for a particular media exceeds a request threshold.

In other embodiments, the time between the initiations of streams can be variable. For example, a media service can start a new stream when the number of requests exceeds a request threshold, regardless of the amount of time that has elapsed since a first request in a time interval. A limit can be placed on the amount of time that is allowed to elapse after a first request is received to limit a user's wait before media playback begins. For example, a media service can be configured to start a new stream after receiving 50 requests for a particular media, but that a new stream is started at least every 15 seconds. Thus, if 50 requests for a particular movie are requested in a first 3-second interval, and only 30 requests are received over the next 15 seconds, the service would start a first stream after 3 seconds and a second stream at the end of the next 15 seconds.

In some embodiments, a media server can deliver a preface video (or other media) to a client before streaming the requested media. The preface video can be delivered to the client upon the client connecting to the media service so that the preface video is available for immediate playback, or in response to a media request. The preface video can be a commercial or any other content. The preface video can be displayed to a user before the requested media begins playing to occupy the user's attention while the server is aggregating requests for the media requested by the user. For example, with reference to FIG. 3, the media service can stream a commercial to client A when this client first connects to the service. The service can instruct client A to play the commercial after receiving client A's request for movie A.

In some embodiments, the media service delivers information about the media stream streamed to each requesting client. For example, media services employing IP multicast technologies can supply the requesting clients with the group address of the stream containing the requested media. Additional stream information can be provided such as the stream bit rate. The media service can also provide a client with information about other streams delivering the requested media, for those streams that were started near the time that the stream delivering media to the client was started. For example, with reference to FIG. 3, clients D-F can receive information about stream 1, and vice versa. The media service can also provide clients D-F with information about streams started after stream 2.

The media service can provide information about any number of streams delivering a particular media to other clients. For example, the media service can provide information about the immediately preceding stream, the immediately trailing stream, both the immediately preceding and successive streams, the X immediately preceding and following streams, or all streams started within a specified time window of the stream currently delivering media to a client (e.g., all streams that were started within 30 seconds, one minute, 90 seconds, etc. of the current stream). Information about other streams delivered to a client can include group address (for IP multicasts), bit rate and the number of clients receiving the stream.

In some embodiments, the media service can begin multiple streams for requests received within a time interval. For example, multiple streams may be started based on the network connection speed available to the clients. If clients A and B have a higher speed connection to the media server relative to client C, the media service can start two streams; a first stream having a higher bit rate that delivers the requested media to clients A and B, and a second stream having a lower bit rate delivering the media to client C.

The media service keeps an active list of all streams that are currently being provided by the service. For each stream, the server can track information related to the stream such as the media being delivered by the stream, the number of clients receiving the stream, the identity of each of the clients receiving the media (e.g., IP address), the bit rate of the stream and the rate at which the media is played back at the clients. The media service can provide updated information about any of the streams in response to any change in network, stream or server characteristics, such as a change in a stream bit rate or the number of clients receiving a given stream. A client can inform the server when the client is no longer receiving a stream if, for example, the user has closed the media playback application or has powered off the client. In the example implementations, a client application can send a Client Stop request in such situations. Or, a Client Stop request can be initiated by a server to drop a stream. In addition, network elements can inform a service if a connection to the client is dropped or lost. In this way, the media service can keep a running tally of how many clients are receiving a stream at any given point in time, to end a stream when there are no longer any clients receiving the stream.

Figure 4:
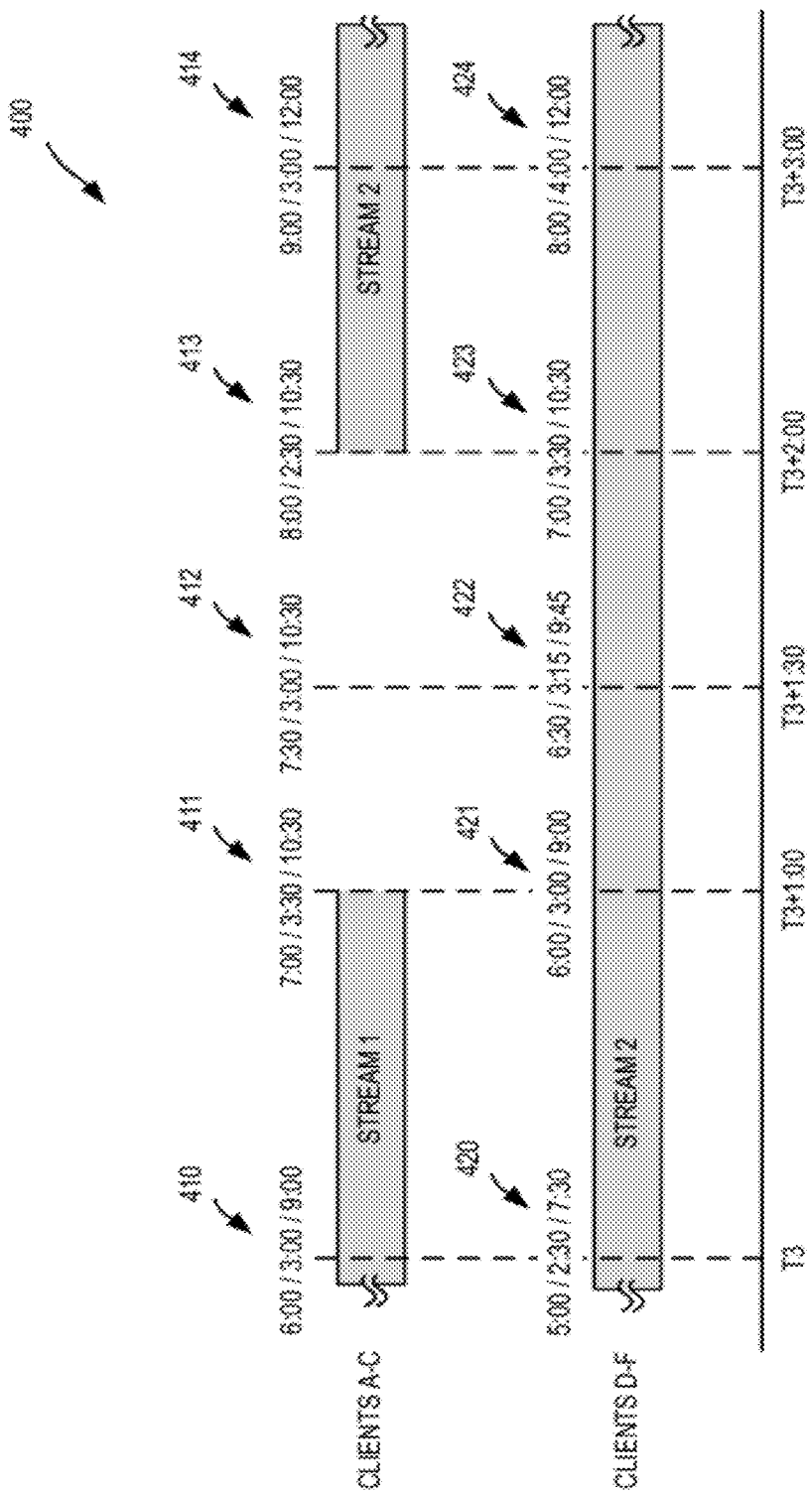
FIG. 4 is a timing diagram illustrating an exemplary merging of media steams.

FIG. 4 is a timing diagram 400 illustrating an exemplary merging of media steams. As media download speed outstrips media playback speed, the amount of media stored at the clients accumulates, and clients can be switched to different streams to receive the media. Thus, the number of active streams can be reduced as clients are aggregated and assigned to fewer streams. In the example implementations, streams can be collapsed in response to a Collapse Stream Event, which can occur when specified collapse conditions are met. Collapse conditions can be set according to specified business rules. Generally, streams are collapsed by assigned clients receiving media from an earlier-starting stream (a preceding stream) to a later-starting stream (a trailing stream). Before clients are added to a trailing stream, the trailing stream is allowed to catch up to a preceding (leading) stream, by either pausing or slowing down the leading stream. This prevents the trailing stream from sending data that has already been received by the preceding stream to clients. For a client receiving video and audio media, the collapse condition can take into account the amount of media already downloaded such that skips or pausing may not be noticed by the user before the preceding stream client switches over to the trailing stream.

The timing diagram 400 continues the example of FIG. 3 and shows the merging of streams 1 and 2 delivering movie A to clients A-F. The time series 410-414 and 420-424 indicate, at a given point in time, how much of movie A has been played at a client, the amount of movie A stored locally at a client, and the point in movie A that a client is currently receiving. For example, the time series 410 (6:00/3:00/9:00) for clients A-C at time T3 indicates that clients A-C have played back six minutes of movie A, have three minutes of movie A stored locally, and are receiving packets corresponding to the nine minute mark of movie A. The timing series 420 (5:00/2:30/7:30) for clients D-F at T3 indicates that clients D-F have played back 5 minutes of movie A, have two and a half minutes of movie A stored locally, and are receiving packets corresponding to the seven and a half minute mark of movie A.

A media server can determine that switching streams at a client is not expected to disrupt playback of a movie at the client based at least in part on one or more of the following: the amount of media that has been delivered, the rate at which the media is played back at the client, the bit rate of the current stream and other streams delivering the media, and the point in the media that each stream is delivering.

At time T3+1:00, the media service determines that clients A-C have enough of movie A stored locally such that switching clients A-C from stream 1 to stream 2 ensures smooth playback of movie A at clients A-C. The server can make the determination of when to switch streams periodically, at predetermined times during streaming or on any other basis. For example, the media service can be configured to determine whether it is appropriate for clients to switch streams several minutes after starting a stream. At T3+3:00, the media service can determine that clients A-C can switch to stream 2 as clients A-C have three and a half minutes of the movie stored locally and stream 2 is only a minute and a half behind stream 1 (i.e., stream 2 is delivering packets corresponding to the nine minute mark of movie A and stream 1 is delivering packets corresponding to the 10 and a half minute mark). The media service determined it was inappropriate to switch clients A-C at T3 as, in this example, the media server is configured to require that a sufficient time margin, for example, two minutes, exists between the two streams. At T3, the margin was 90 seconds; at T3+1:00, the margin is two minutes. Margins of other durations can be used, and the media service may not require any margin before switching streams.

Having determined that clients A-C are to be switched to stream 2, the media service discontinues streaming stream 1 to clients A-C at time T3+1:00. The media service delays instructing clients A-C to receive movie A packets from stream 2 until stream 2 has caught up to where stream 1 left off, i.e., the 10:30 mark. Accordingly, clients A-C play movie A from T3+1:00 to T3+2:00 from local memory; clients A-C have three and a half minutes of movie stored at T3+1:00, three minutes stored at T3+1:30, and two and half minutes stored at T3+2:00. At T3+2:00, the server determines that stream 2 has caught up to where stream 1 left off and instructs clients A-C to receive movie A from stream 2. From T3+2:00 onward, clients A-F are all receiving movie A from stream 2, and clients A-C can again accumulate movie A data in local memory. If no other clients are receiving stream 1, the server can end streaming movie A via stream 1. Streams 1 and 2 have thus merged, reducing the amount of bandwidth consumed by streaming movie A.

Although clients A-C are shown in FIG. 4 as switching to the immediately trailing stream, stream 2, clients A-C can switch to any other stream streaming movie A, as long as switching streams does not disrupt movie A playback. For example, the media service could determine at some point that it has enough of movie A stored locally to allow it to switch to stream 3, a stream that started after stream 2. The switch to stream 3 would generally occur at a later point in time than when clients A-C could first switch to stream 2, as to avoid disruption in playback, as clients A-C would have a greater amount of movie A stored locally to account for the greater delay in start times between streams 1 and 3.

The media server could also switch clients A-C to a stream that started prior to stream 1 if the earlier-started stream is delivering packets at a point in movie A that is earlier than the point at which stream 1 is delivering. Switching to an earlier-started stream is possible if, for example, the earlier-started stream is being delivered at a slower rate than stream 1. Clients A-C san switch to the earlier-started stream at a point when stream 1 has caught up to the earlier-started stream (packets streamed for the same point in movie A). Similarly, the media server can switch clients A-C to a later, trailing stream more quickly if the trailing stream is delivered at a higher rate (which clients A-C can also receive). The server can switch clients A-C to the trailing stream at the point the trailing stream catches up to stream 1.

A client providing the ability for a user to move forwards or backwards in a data stream (e.g., skip ahead in a movie or a song) can, in the example implementations, send a Change Stream request to the media server in response to a user repositioning the point of playback. If the client desires to move forward in the media, the client modifies the position attribute of a stream, leaving the rest of the stream attributes unchanged, to jump forward past the current downloading position. In general, if the client is repositioning to a point already downloaded, the client is not required to send a Change Stream request and can jump forward to the desired position within the portion of the media stored locally. This enables a video or audio client to continue receiving the stream while providing playback at a different point in the stream. In addition, a client can request a switch to a faster stream by sending a Change Stream request that includes the desired stream bit rate or, that the client simply desires a faster stream.

In some embodiments, a client or server can detect that the bandwidth of the connection between the two is not able to support an active stream. In such a case, in the example implementations, a client can send a Change Stream request asking for a lower bandwidth stream, or the data server can issue a Server Change Stream request that switches the client over to a slower stream and can include notifying the client that the client is being moved to a new stream.

A client can request a faster stream if the client detects the connection to the media service is capable of supporting a stream with a faster bit rate than that of the stream the client is currently receiving. Switching to a stream with a higher bit rate can allow, for example, a higher-quality version of the media to be played back to the user. A media server can switch one, multiple or all clients receiving a stream to another stream at a time.

Figure 5:
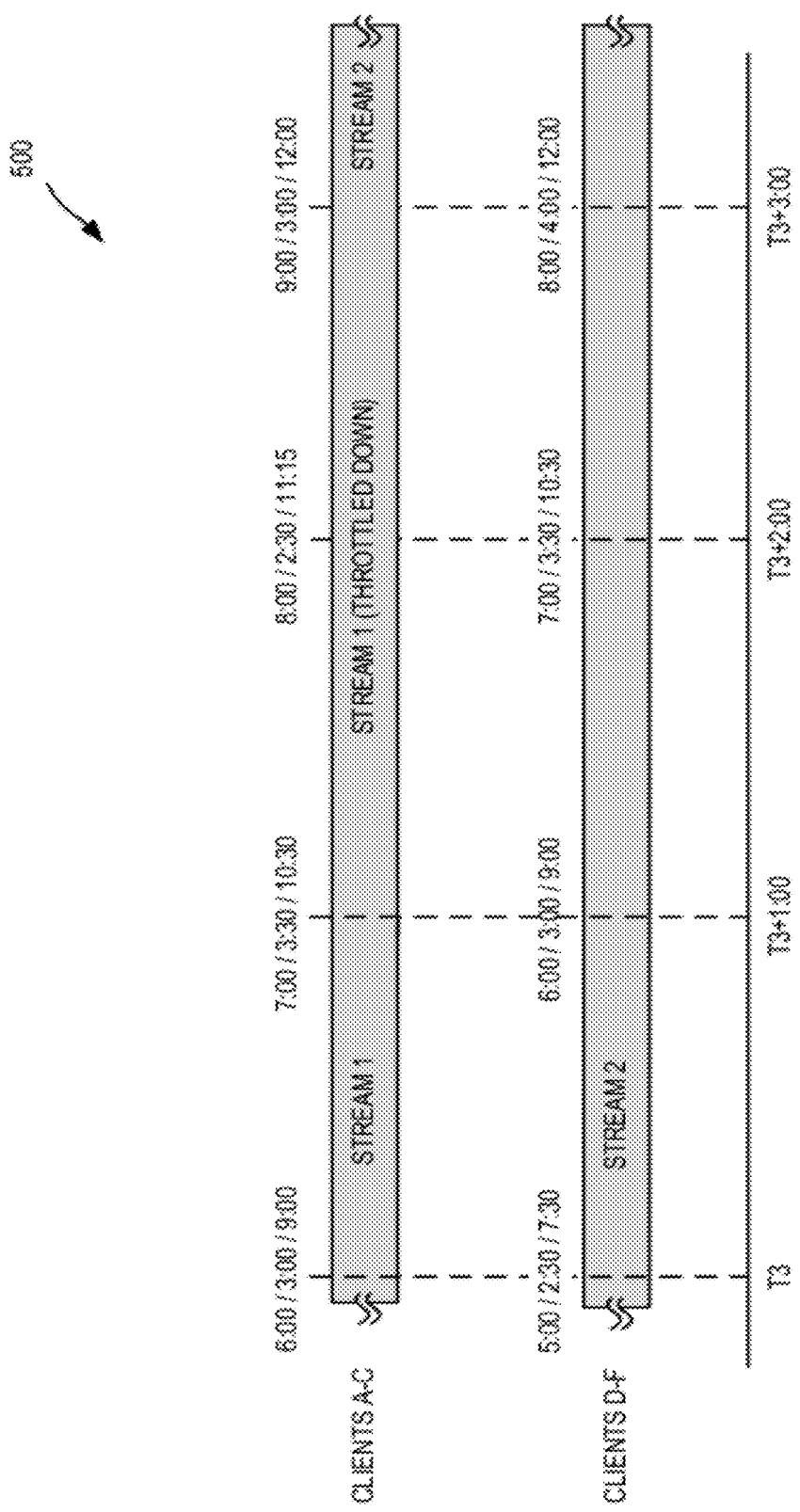
FIG. 5 is a timing diagram illustrating the exemplary merging of media streams of FIG. 4 with the bit rate of the leading stream being throttled down.

FIG. 5 is a timing diagram 500 illustrating the exemplary merging of media streams of FIG. 4 with the bit rate of the leading stream being throttled down. In response to determining at time T3+1:00 that clients A-C are to switch to stream 2, the media server throttles down (decreases) the stream 1 bit rate from 90 seconds of media delivered per minute to 45 seconds per minute to allow the streams to synchronize. At T3+1:00, the streams are offset by 90 seconds, at T3+2:00, the streams are offset by 45 seconds, and at T3+3:00, the streams are synchronized. With the streams synchronized, the media server instructs clients A-C to receive movie A via stream 2, and the server discontinues stream 1.

The media service can decide which streams to collapse based on factors other than those previously mentioned. For example, the service can determine which streams to merge based on the number of clients to which a stream is being delivered. The media service can instruct clients to switch to a stream being received by a greater number of clients, thus preventing extending the life of streams being received by a small number of clients.

FIGS. 6A-6C are timing diagrams illustrating exemplary merging of multiple streams and multiple merging stages by an on-demand media service that begins new media streams for a movie at 15 second intervals. Timing diagram 600 illustrates the merging of groups of four streams. Streams 1 through 8 have been started by the service at 15-second intervals. The service can be configured such that streams are merged four at a time once all four streams have been streaming for at least two minutes. At three minutes after stream 1 has begun, the service merges streams 1-4 by switching the clients of streams 1-3 to stream 4 and discontinuing streams 1-3. At four minutes, the media service merges streams 5 through 8. In this manner, a media server can quickly reduce the number of streams that are simultaneously streaming a requested movie or other media. Thus, although streams can be started at relatively short intervals (e.g., 5, 10, 15 seconds) in order to prevent a user from waiting too long before the media begins playing at a client, the media server can pare down the streams to those that have started a greater time interval (e.g., one minute) once a sufficient amount of media is stored locally at each client.

As the remaining streams continue to deliver the media to the clients, the amount of media stored locally at the clients continues to accumulate, allowing for the further merging of streams. FIG. 6B shows a timing diagram 610 in which the media streams undergo a second merging stage. The media service determines at 12 minutes after starting stream 1, that streams started one minute apart can be merged together. At 12 minutes, clients receiving stream 4 are switched to stream 8; at 14 minutes, clients receiving stream 12 are switched to stream 16, etc. Thus, after this second stage of merging, the remaining streams are those that were started two minutes apart. FIG. 6C is a timing diagram of 620 illustrating a third merge stage in which streams begun two minutes apart are merged, leaving only streams started four minutes apart as the remaining active streams.

A media server can perform more or fewer merge stages than those shown in FIGS. 6A-6C, with each stage merging any number of streams. Each merge stage can start at any time, as long as switching streams does not disrupt media playback. Stream merging can be limited by the amount of local memory available to store the media. For example, a client that can store at most four minutes of a movie may not be able to switch to a stream that is temporally offset from the current stream by more than four minutes.

In some embodiments, clients can take an active role in determining if switching streams is viable and take an active role in actual switching operations. For example, a client knows how much media is stored locally and can determine if switching to another stream would disrupt playback based on information about other streams. Information about other streams can be provided by the media service when a current stream is started, or later as stream information changes due to streams being merged, stream bit rates being modified, new streams being started or other events. Information about other streams can include the time at which the stream was started (either the absolute time or the time relative to the current stream), stream bit rate, the point in the media the stream is currently delivering, the number of clients receiving the stream, etc. In an IP multicast environment, once a client has decided to switch streams, the client can inform the network that it wishes to receive packets addressed to the current stream and provides the network with the group address of the stream to which it wishes to switch. In addition, the client informs the media service that it has switched streams by providing identifying information about the stream it has disconnected from and the new stream to which it is now receiving.

In some embodiments, the media streaming bandwidth reduction methods described herein can be implemented by an interface built on top of an existing stream media service. The interface can implement start time synchronization methods described herein by, for example, receiving client requests for media, aggregating the requests over a time interval, sending a single request for the media at the end of the time interval to the existing media service, receiving a media stream from the service, initiating a multicast to deliver the requested media to the requesting clients and providing a group address to the requesting clients. The interface can implement stream merging methods described herein by, for example, determining that clients can switch from a first stream to a second stream without disrupting playback to the clients, instructing the clients to discontinue receiving the media via the first stream, instructing the clients to switch to the second stream to receive the request media, and informing the media service to end streaming the first stream.

Figure 7A:
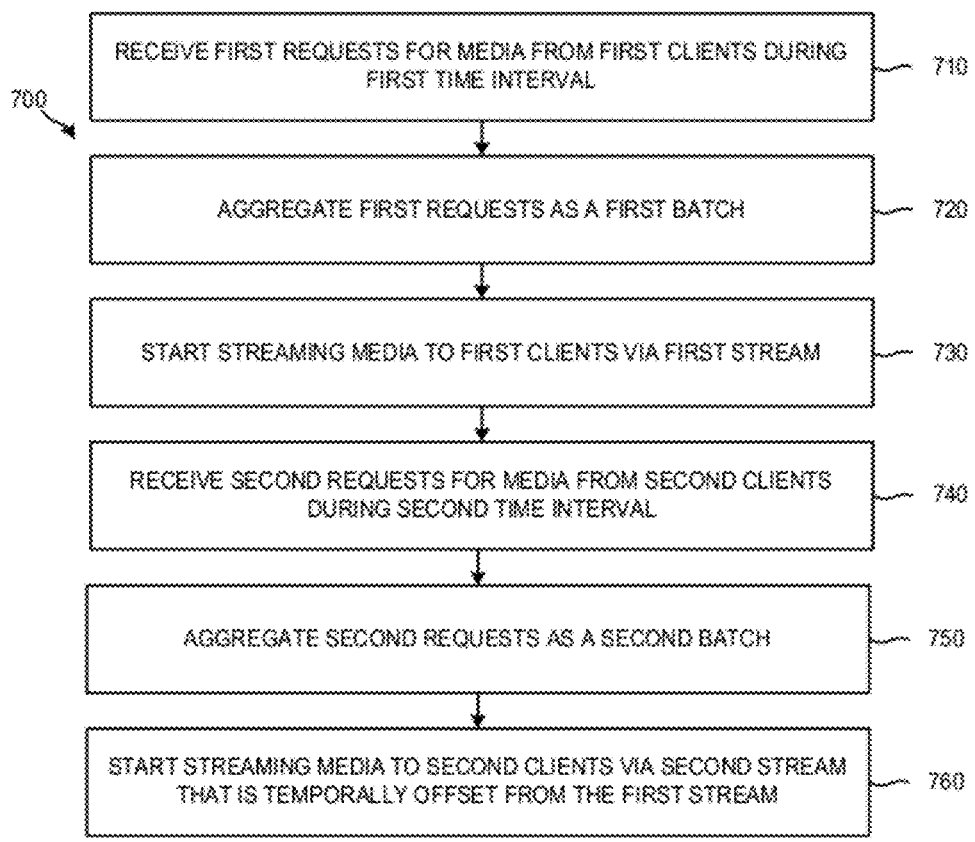
FIG. 7A is a flowchart of an exemplary method of aggregating media requests to reduce streaming media bandwidth.

FIG. 7A is a flowchart of an exemplary method 700 of aggregating media requests to reduce media streaming bandwidth. The method 700 can be performed by, for example, an on-demand streaming movie service receiving numerous requests for a movie from a large number of clients over an extended time period, and configured to begin a stream to deliver the movie every 10 seconds. At 710, a plurality of first requests for media is received from one or more first clients during a first time interval. In the example, the service receives a plurality of requests from clients 1-20 during a first 10-second interval. At 720, the first requests are aggregated as a first batch. In the example, the service aggregates the requests from clients 1-20 into a first batch. At 730, media starts streaming to the one or more first clients via a first stream. In the example, the service starts streaming the movie to clients 1-20 via a first stream to service the first batch. At 740, a plurality of second requests for the media is received from one or more second clients during a second time interval. In the example, the media service receives requests for the movie from clients 21-50 during a second 10-second interval. At 750, the second requests are aggregated as a second batch. In the example, the requests from clients 21-50 received during the second 10-second interval are aggregated as a second batch. At 760, media starts streaming to the one or more second clients via a second stream that is temporally offset from the first stream, to service the second batch. In the example, the service starts streaming the movie to clients 21-50 via a second stream that is started after the first stream.

Figure 7B:
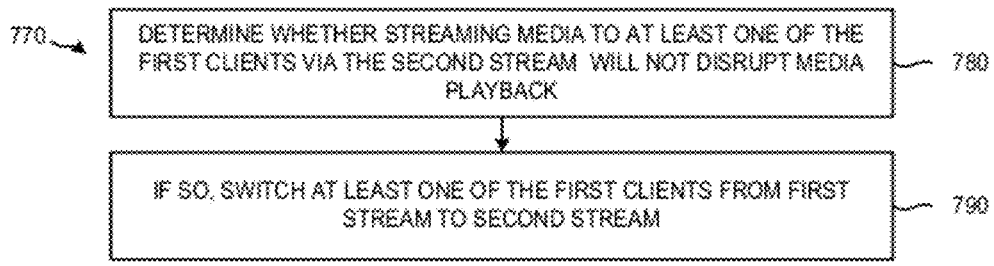
FIG. 7B is a flowchart of additional exemplary tasks that can be performed by the method illustrated by the flowchart of FIG. 7A.

FIG. 7B is a flowchart of additional exemplary tasks 770 that the method 700 can further comprise. At 780, whether streaming the media to at least one of the plurality of first clients via the second stream in place of the first stream will not disrupt playback of the media at the at least one of the plurality of first clients is determined. Continuing with the example, the media service can determine whether streaming the movie to clients 1-20 via the second stream in place of the first stream will not disrupt playback of the movie at clients 1-20. As part of this determining, the media service can determine whether clients 1-20 have sufficient durations of the movie stored locally. At 790, if switching streams does not disrupt playback at the at least one of the plurality of first clients, the at least one of the plurality of first clients is switched from the first stream to the second stream. In the example, the media service switches clients 1-20 from the first stream to the second stream.

Figure 7C:
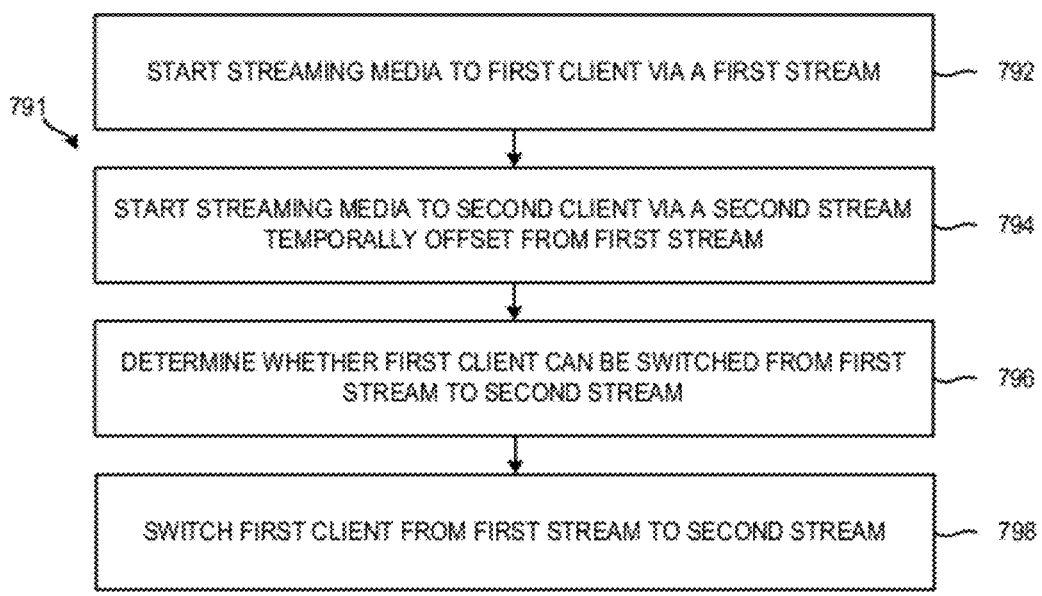
FIG. 7C is a flowchart of an exemplary method for reducing the number of streams streaming a given media.

A media service can perform stream collapsing and stream batching in combination (as in FIG. 7B) or perform stream collapsing alone (as in FIG. 7C). FIG. 7C is a flowchart of an exemplary method 791 for reducing the number of streams streaming a given media. The method 791 can be performed by an on-demand movie service that has received multiple requests for a movie A at various times from multiple clients X, Y and Z. Client Y requests movie A two minutes after client X requests movie A, and client Z requests movie A several minutes after client Y makes its request. At 792, media starts streaming to a first client via a first stream. In the example, the service starts streaming movie A to a client X via a first stream. At 794, the media starts streaming to a second client via a second stream that is temporally offset from the first stream. A number of different streams, including the first and second streams, are concurrently streamed. In the example, the service starts streaming movie A to client Y via a second stream. The second stream is started later than the first stream. Movie A is streamed to client Z via a third stream that is temporally offset from the first and second streams. At 796, whether the first client can be switched from the first stream to the second stream without disrupting playback of the media at the first client is determined. In the example, the service determines that client X can be switched from the first stream to the second stream without disrupting playback at client X. At 798, if the first client can be switched to the second stream without disrupting playback of the media at the first client, the first client is switched from the first stream to the second stream to reduce the number of different streams concurrently being streamed for the media. In the example, the first client is switched from the first stream to the second stream. The service discontinues the first stream, and the number of streams streaming movie A to clients X, Y and Z is reduced from three to two.

FIGS. 8A-8E are state diagrams 800-804 of an exemplary data server employing the tools and technologies described herein in example implementations. The server manages creation of streams, deletion of streams, adding clients to streams, and removing clients from streams. The server handles various events as shown in FIGS. 8A-8E. The server can use an underlying multicast protocol layer to provide lower level operations such as setting up a multicast stream, delivering media using the stream, and tearing down the multicast stream. As various multicast protocols can be used, the details of the multicast protocol layer (e.g., multicast command names, data structures, packet flow management, error control, etc.) are not addressed herein.

The server starts at 805. At 806, the server is initialized and waits for events at 807. As part of an event handling loop, the server processes various types of events as they are received. An event can be implemented with any of various types of messages or signals. At 808, the server determines whether a Client New Stream request event has occurred. A Client New Stream request event can occur when a client desires a stream of data, such as a movie. If a Client New Stream request event has occurred, the server initiates the Stream Request flow 810. If not, the server continues to 820 where it determines whether a Start Stream Interval event has occurred.

A Start Stream Interval event can be associated with, for example, the expiration of a time interval, or with the number of requests received during a time interval meeting or exceeding a request count threshold, even though the time interval has not expired. A Start Stream Interval event is fired by an internal timer loop of the server. If a Start Stream Interval event has occurred, the server initiates the Start Stream flow 822. If not, the server checks whether a Client Stream Change Request event has occurred at 828. A Client Stream Change Request event can be associated with, for example, a client request to switch to a faster or slower stream, or a client request to switch positions (forward or backward) in a stream. If a Client Stream Change Request event has occurred, the server initiates the Change Stream flow 830. If not, the server continues to 840, where it checks to see whether a Collapse Streams event has occurred. The server selectively fires Collapse Stream events from an internal timer loop. A Collapse Streams event can be associated with the server determining that clients receiving a first stream can be switched over to a second stream. If a Collapse Streams event has occurred, the server initiates the Collapse flow 842. If not, the server checks whether a Stream Done event has occurred at 854. A Stream Done event can be issued in response to the stream delivering all of the data in stream, and can be associated with a callback from the multicast protocol layer or other notification. If a Stream Done event is received, the server initiates the Stream Done flow 856. After completing a Stream Request 810, Start Stream 822, Change Stream 830, Collapse 842 or Stream Done 856 flow, the server returns to 807 to wait for new events.

Figure 8A:
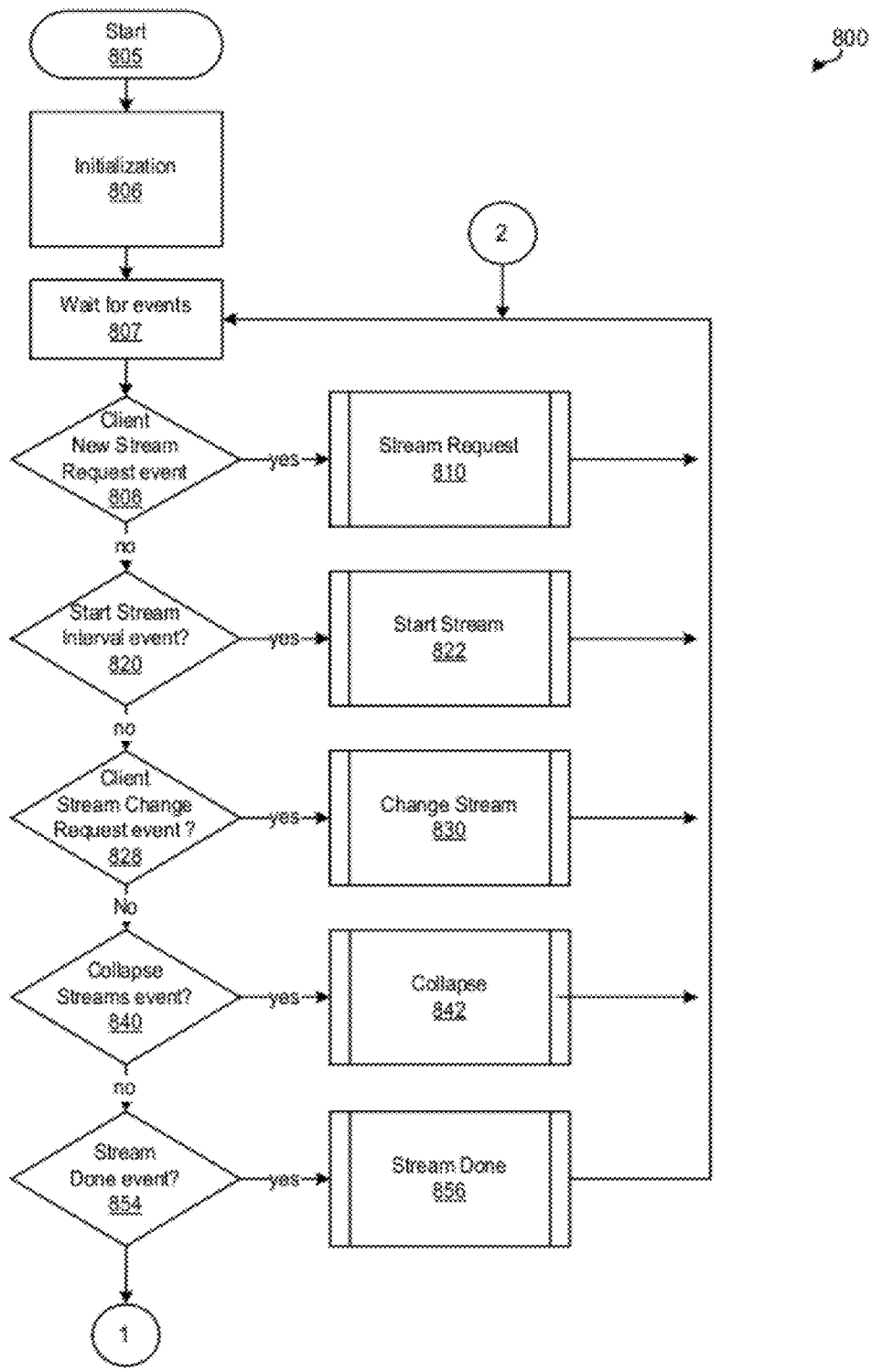
FIGS. 8A-8E are state diagrams of an exemplary data server in example implementations.
Figure 8B:
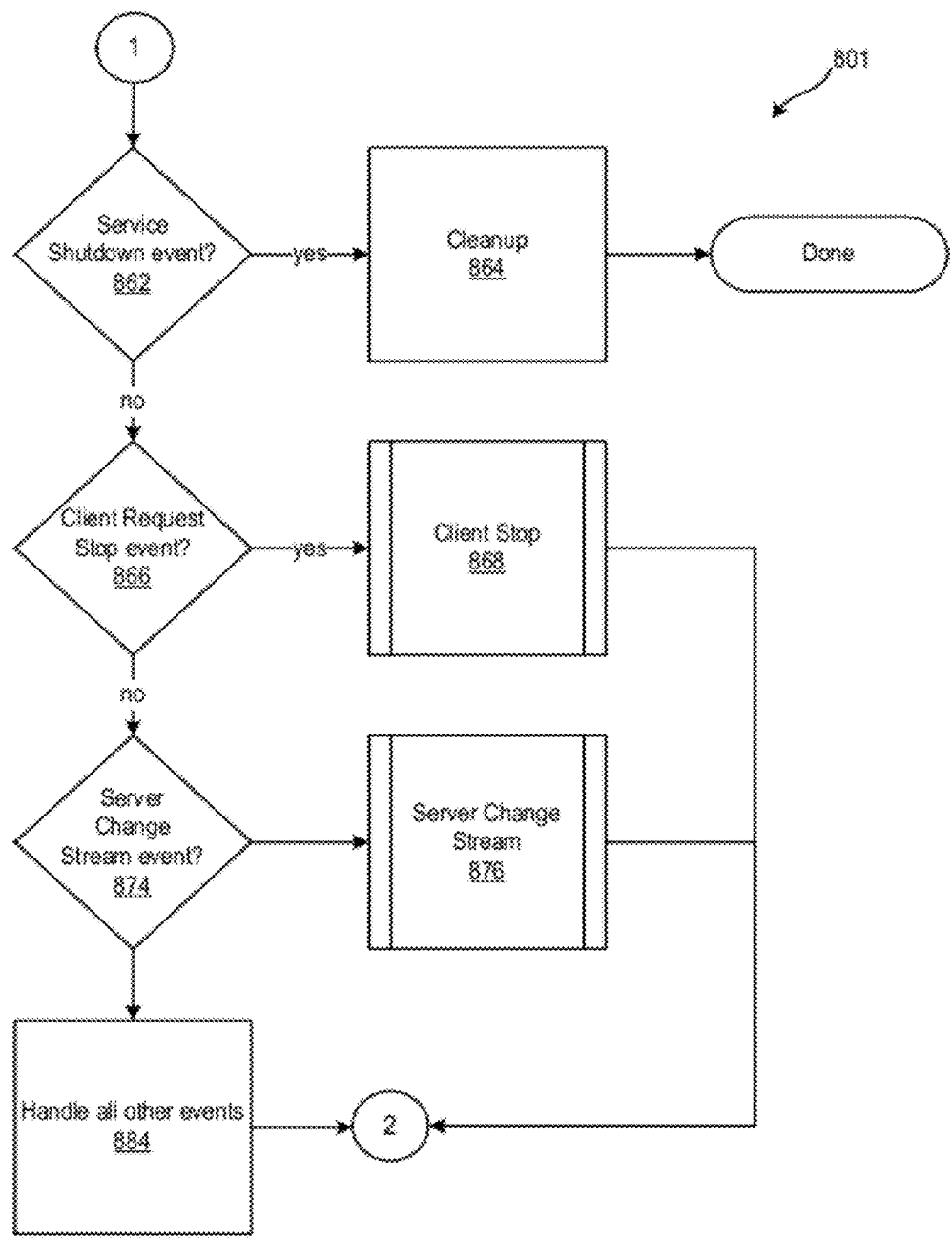

Turning to FIG. 8B, if the server has not detected a Stream Done event, the server continues to 862 and checks whether a Service Shutdown event has occurred. A Service Shutdown event can be associated with, for example, the media server being shut down by the media service provider to perform server maintenance. If a Service Shutdown event has occurred, the server performs cleanup tasks 864 and finishes providing media streaming services. If not, the server determines whether a Client Request Stop event has occurred at 866. A Client Request Stop event can be received from a client in response to a user stopping a media playback application or turning off a client computing device. If a Client Request Stop event has been received, the server initiates the Client Stop flow 868. If not, the server continues to 874 where it checks whether a Server Change Stream event has occurred. The Server Change Stream event can be associated with a callback from the multicast protocol layer or other notification. With a Server Change Stream event, the server instructs the client to switch to another stream. If a Server Change Stream has occurred, the server initiates the Server Change Stream flow 876. If not, the server continues to 884 where it handles events other than those illustrated in FIGS. 8A and 8B. After an event has been handled, the server returns to 807 to wait for additional events if appropriate.

Figure 8C:
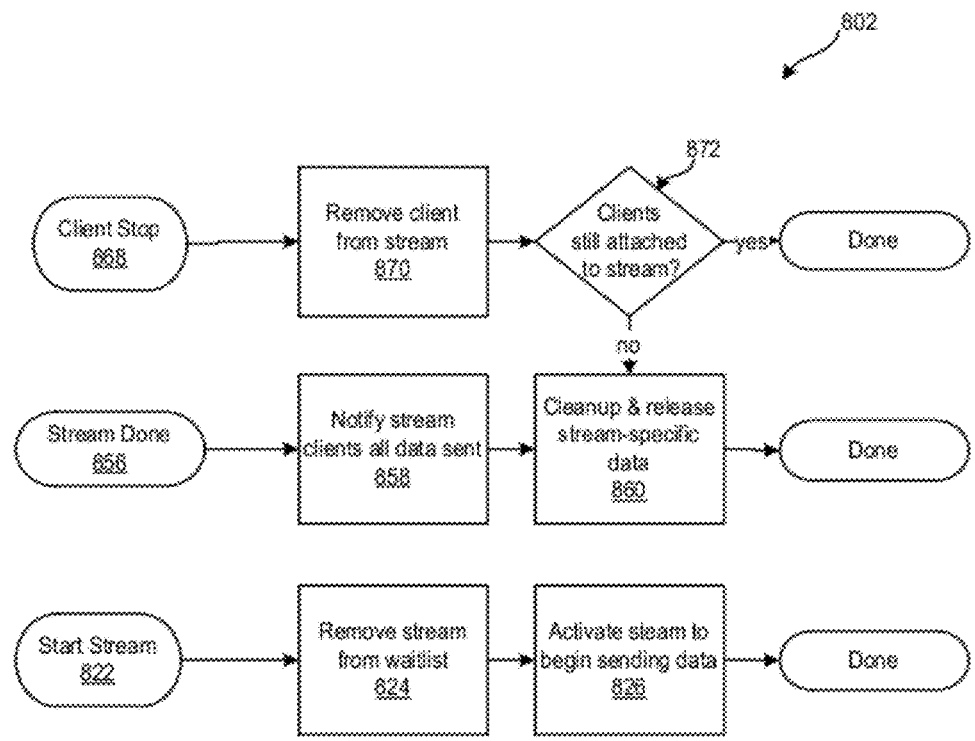

FIG. 8C contains state diagrams 802 of the Client Stop, Stream Done and Start Stream flows. The Client Stop flow begins at 868. At 870, the server removes the stopped client from the stream delivering data to the client. At 872, the server determines whether any clients are still attached to the stream. If any clients are still attached to the stream, the server finishes the Client Stop flow. If not, the server performs cleanup tasks and releases the stream-specific data at 860 and finishes the Client Stop flow.

The Stream Done flow begins at 856. At 858, the server notifies any clients attached to the stream that the stream has finished sending the requested data. At 860, the server performs cleanup tasks and releases stream-specific data. After performing these cleanup and release tasks, the server finishes the Stream Done flow.

The Start Stream flow begins at 822. At 824, the server removes the stream to be started from the wait list. The server activates the stream to begin sending data at 826. For example, the server notifies the multicast protocol layer to set up the stream and begin streaming data, providing the multicast protocol layer with information used to start the stream. The multicast protocol layer can in turn inform clients attached to the stream that the stream is inbound. The server then finishes the Start Stream flow.

Figure 8D:
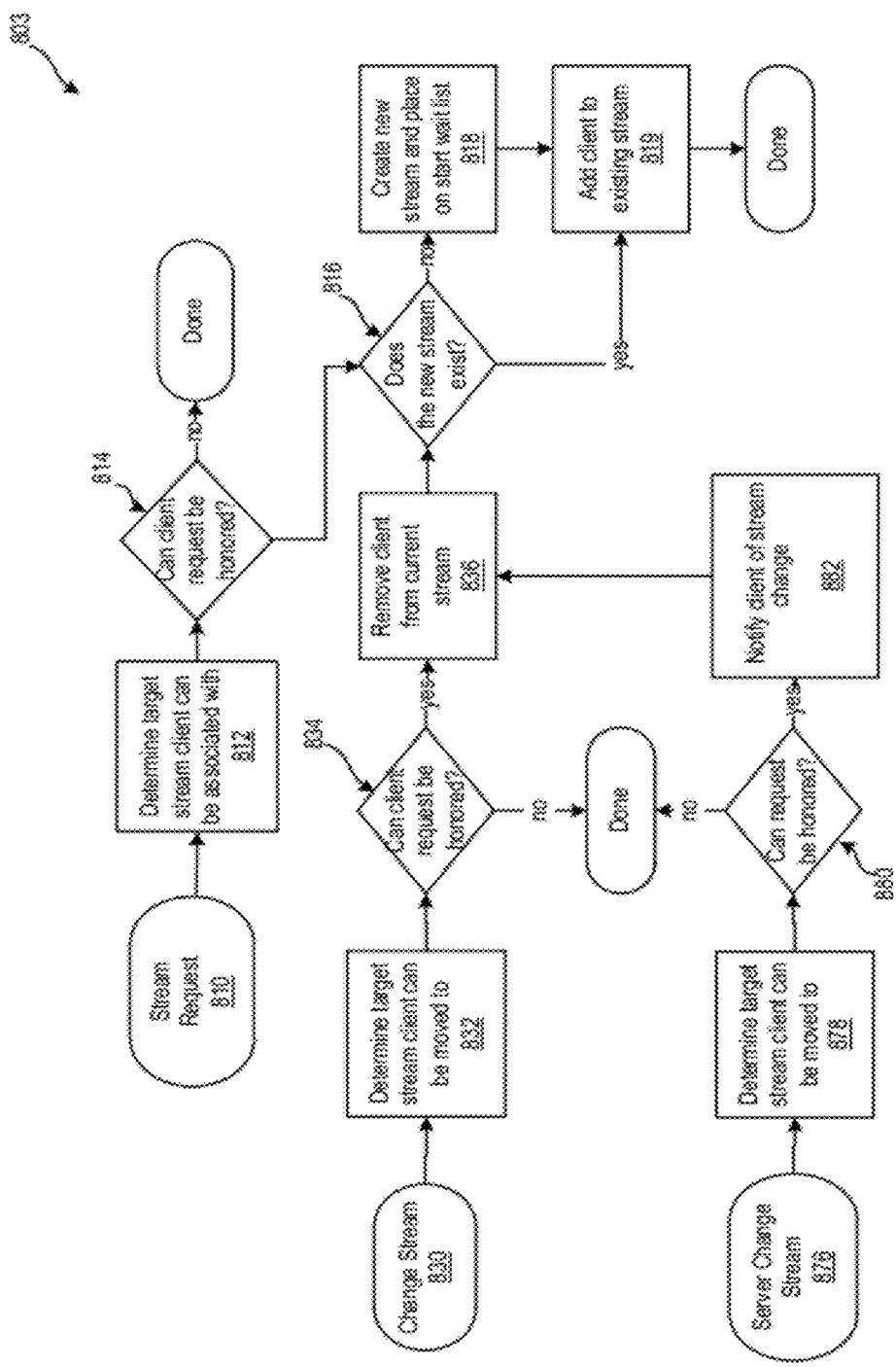

FIG. 8D contains state diagrams 803 of the Stream Request, Change Stream and the Server Change Stream flows. The Stream Request flow begins at 810. At 812, the server determines a stream with which a client is to be associated. At 814, the server determines whether the request can be honored. If not, the Stream Request flow ends. Alternatively, the server prompts the client to provide one or more fallback choices for the requested stream, prompts the client to provide an ordered list of requested streams as fallbacks, or selects another stream that is close to the requested stream. On the other hand, if the request can be honored, the server determines whether a stream that satisfies the request exists at 816. If not, at 818, the server creates a new stream and places the new stream on the start stream wait list. If a stream that satisfies the request exists (including any newly created stream from 818), the server adds the client to the existing stream at 819, and finishes the Stream Request flow.

The Change Stream flow begins at 830. At 832, the server determines a target stream to which the client can be moved. At 834, the server determines whether the request from the client can be honored. If not, the Change Stream flow ends. If the client request can be honored, the server removes the client from the current stream (to which the client has been attached) at 836. The server then proceeds to 816, where it joins the Stream Request flow; the server checks whether the stream the client is to be moved to exists, creates the stream if appropriate, adds the client to the target stream and finishes the Change Stream flow.

The Server Change Stream flow begins at 876. At 878, the server determines a target stream to which the client can be moved. At 880, the server determines whether the server-initiated change stream request can be honored. If not, the Server Change Stream flow ends. If the change stream request can be honored, the server notifies the client of a stream change at 882. The server then proceeds to 836, where the Server Change Stream flow continues in the same manner as the Change Stream flow, as described above.

Figure 8E:
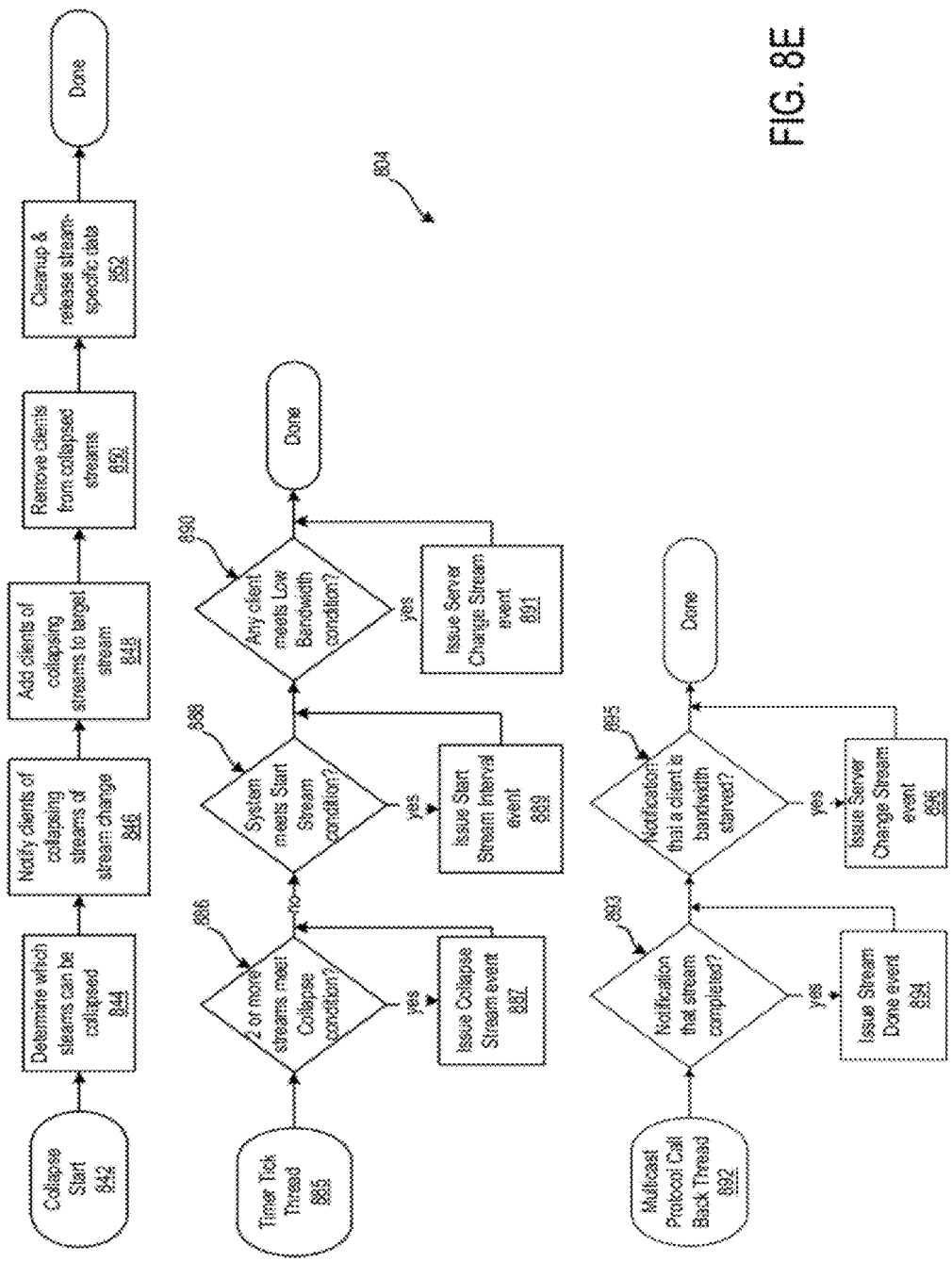

FIG. 8E contains state diagrams 804 of the Collapse flow as well as the Timer Tick and Multicast Protocol Callback threads. The Collapse flow starts at 842. At 844, the server determines which streams can be collapsed (or merged). At 846, the server notifies clients of collapsing streams of the pending stream change. At 848, clients of collapsing streams are added to a target stream. At 850, clients are removed from the collapsed streams. At 852, the server performs cleanup tasks and releases stream-specific data and finishes the Collapse flow.

The Timer Tick thread and the Protocol CallBack thread issue several of the events described herein. The Timer Tick thread operates periodically (i.e., every "tick," where a tick can be 1 second, 0.5 seconds, etc.) during an interval. The Timer Tick thread starts at 885. At 886, the server determines whether two or more streams meet collapse conditions. If two or more streams meet collapse conditions, the server issues a Collapse Stream event at 887. At 888, the server determines whether the system meets a start stream condition. The system can meet a start stream condition, for example, if, based on the system clock, the server determines that a time interval has expired. If the system meets a start stream condition, the server issues a Start Stream Interval event at 889. At 890, the server determines whether any client meets a low bandwidth condition. If any client meets a low bandwidth condition, at 891 the server issues a Server Change Stream event. The server then finishes the Timer Tick thread.

Like the Timer Tick thread, the Multicast Protocol thread can start periodically. The Multicast Protocol thread starts at 892. At 893, the server determines whether it has received a notification from the multicast protocol layer that a data stream has completed. That is, the server checks whether all of the data in a stream has been sent. If all of the data in a stream has been sent, the server issues a Stream Done event at 894. At 895, the server checks whether it has received a notification that a client is bandwidth starved. That is, the server determines whether it has received a notification that a client is to be transferred to a slower stream. If the server has received such a notification, the server issues a Server Change Stream event at 896. The server then finishes the Protocol CallBack thread. Alternatively, instead of a callback mechanism, the server uses polling of the multicast protocol layer, polling of clients or another mechanism. In some embodiments, the server does not support callbacks, and tasks performs by the Multicast Protocol CallBack thread can be performed by the Timer Tick thread. For example, the Timer Tick thread can determine whether a stream has completed or whether a client is bandwidth starved and issue Stream Done and Server Change Stream events, respectively.

A Service Shutdown event can be issued when the server is to be shut down. In response to the Service Shutdown event, the server stops all streams, as gracefully as possible, and performs cleanup tasks.

Figure 9A:
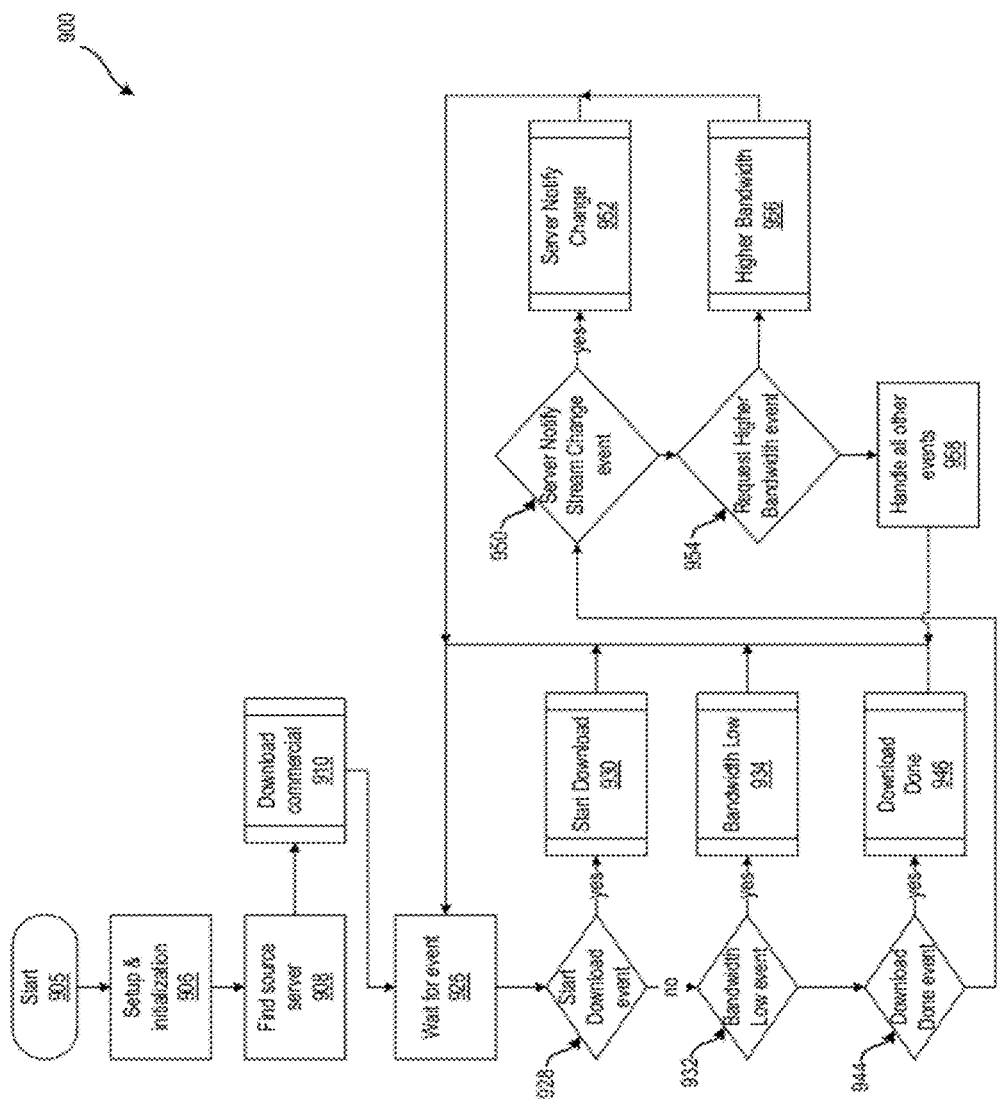
FIGS. 9A-9C are state diagrams of an exemplary download client in example implementations.
Figure 9B:
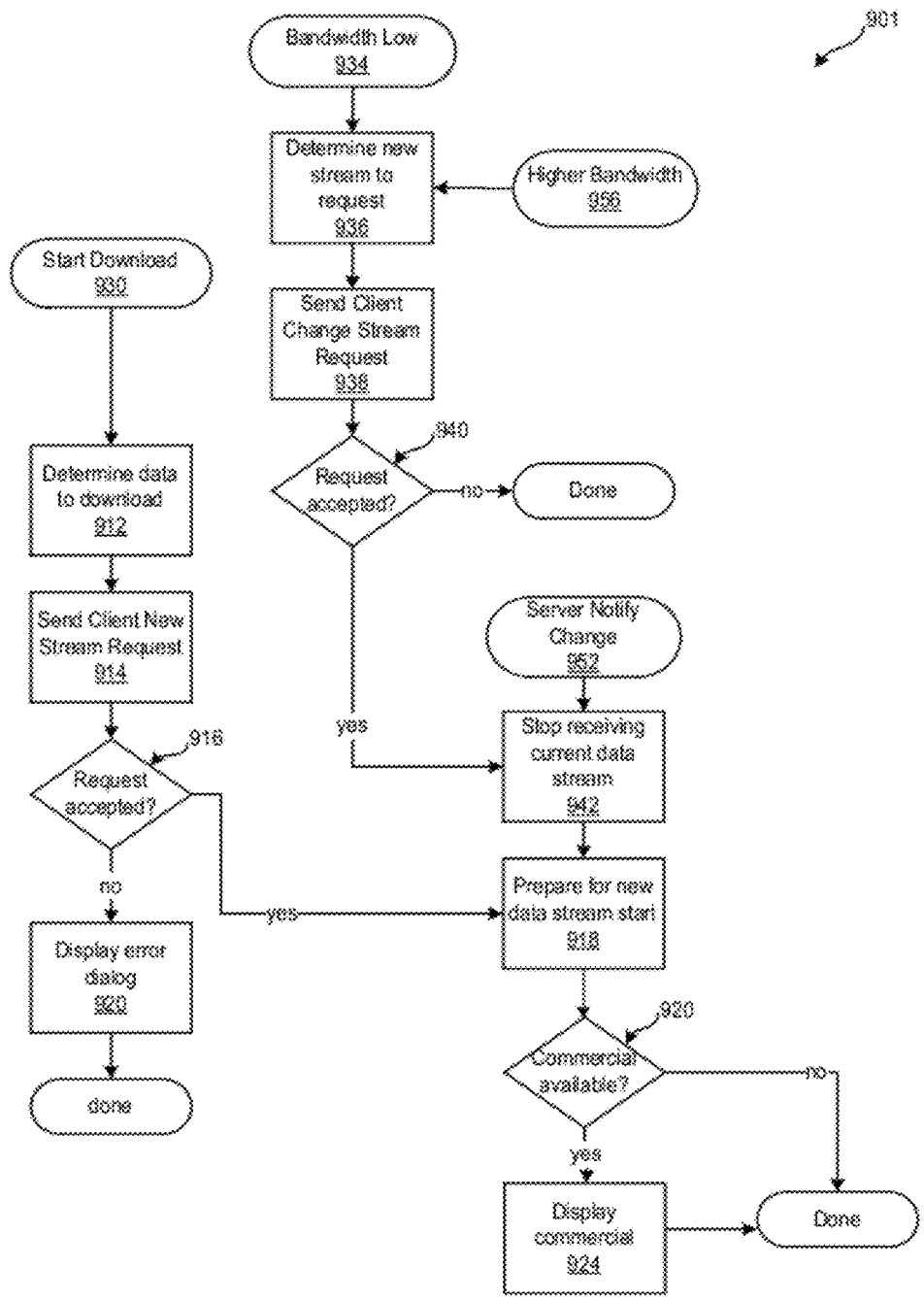
Figure 9C:
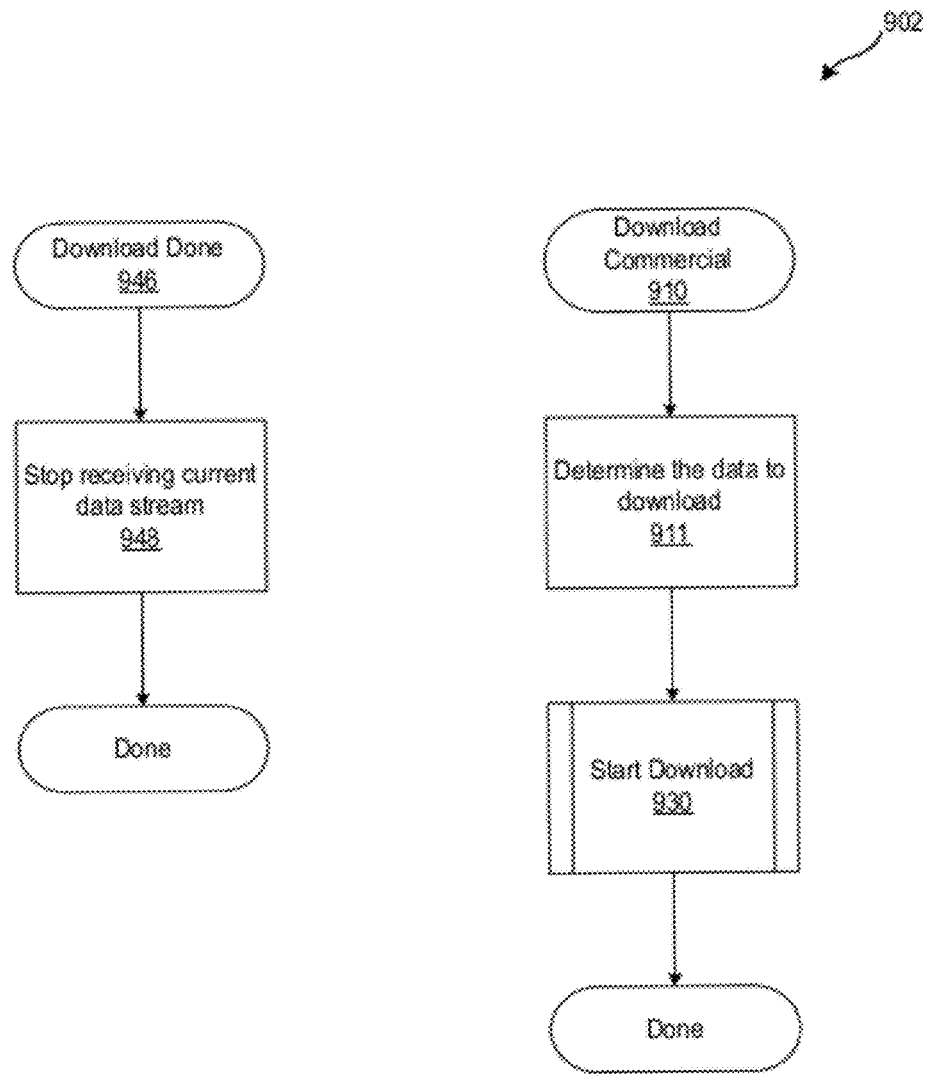

FIGS. 9A-9C are state diagrams 900-902 of an exemplary download client employing the tools and technologies described herein in example implementations. A client receives streamed media data and plays back media, and sends/responds to requests to/from a server to be added to a stream or dropped from a stream. The client can use a multicast protocol layer that provides lower level operations for receiving streamed data.

The client starts at 905. At 906, the client performs setup and initialization tasks. The client locates the data server at 908 and initiates the Download Commercial flow 910. After the Download Commercial flow 910 completes, the client proceeds to 926 where it waits for events. As part of an event handling loop, the client processes various types of events as they are received. An event can be implemented with any of various types of message or signal. In some embodiments, the client can skip downloading the commercial.

At 928, the client determines whether a Start Download event has occurred. A Start Download event can occur when a user requests a particular media item for download. If a Start Download event has occurred, the client initiates the Start Download flow 930. If not, the client continues to 932 where it determines whether a Bandwidth Low event has occurred. A Bandwidth Low event is generated when, for example, the underlying multicast technology or network subsystem notifies the client that the network is not able to support the current download rate. Or, the client can determine this itself and generate the Bandwidth Low event if the download data rate is not able to keep up with the playback mechanism or other client needs. The Bandwidth Low event can also be generated when a user specifically asks for a lower resolution or audio quality playback. Or, when the server determines that the bandwidth is too low for a given stream or client, a client can receive a Server2Client_NotifyStreamChange request as the server moves the client to a less bandwidth intensive stream. In response to receiving Server2Client_NotifyStreamChange request, the client can generate a Server Notify Stream Change event that is processed as part of the event handling loop at the server.

If a Bandwidth Low event is generated, the client initiates a Bandwidth Low flow 934. If not, the client checks whether a Download Done event has occurred at 944. A Download Done event can occur when, for example, the client receives a Data Stream Done event via the underlying multicast technology. If a Download Done event has occurred, the client initiates a Download Done flow 946. If not, at 950, the client determines whether a Server Notify Stream Change event has occurred. If a Server Notify Stream Change event has occurred, the client starts the Server Notify Change flow 952. At 954, the client determines whether a Request Higher Bandwidth event has occurred. For example, a High Bandwidth event occurs when the user requests higher resolution or quality, or the client determines (by itself, from the multicast protocol layer, or otherwise) that there is support for a higher bandwidth stream. If a Request Higher Bandwidth event has occurred, the client initiates a Higher Bandwidth flow 956. The client handles all other events at 958. After a Start Download 930, Bandwidth Low 934, Download Done 946, Server Notify Change 952 and Higher Bandwidth flow 956 has finished, the client returns to 926 to wait for additional events.

FIG. 9B contains state diagrams 901 of the Start Download 930, Bandwidth Low 934, Higher Bandwidth 956 flow and Server Notify Change 952 flows. The Start Download flow begins at 930. At 912, the client determines the data to be downloaded from the server. At 914, the client sends a Client New Stream request to the server. At 916, the client determines whether the request has been accepted. If not, the client displays an error dialog at 920 and finishes the Start Download flow. If the request has been accepted, the client prepares for the start of a new incoming data stream at 918. At 920, the client determines if a commercial is locally available for playback. If a commercial is locally available, the client plays the commercial at 924 while waiting for the requested media stream to start. The client then ends the Start Download flow.

The Bandwidth Low flow begins at 934 and the Higher Bandwidth flow begins at 956. Both flows continue at 936, where the client determines a new stream (a faster or slower stream) to request. At 938, the client sends a Client Change Stream request to the server. At 940, the client determines whether the request was accepted. If not, the client finishes the Bandwidth Low and Higher Bandwidth flows. If the request was accepted, the client discontinues receiving the current data stream at 942 and prepares for the start of a new data stream at 918. The client determines whether a commercial is available, and if so, plays the commercial before ending the Bandwidth Low or Higher Bandwidth flow.

The client starts the Server Notify Change flow at 952 and continues to 942, where it stops receiving the current data stream and then follows the same flow as the Bandwidth Low and Higher Bandwidth flows.

FIG. 9C contains state diagrams 902 for the Download Done 946 and the Download Commercial 910 flows. The Download Done flow starts at 946. The client discontinues receiving the current data stream at 948 and then finishes the Download Done flow.

The Download Commercial flow starts at 910. At 911, the client determines the data to be downloaded, initiates the Start Download flow 930, and, once the Start Download flow completes, finishes the Download Commercial flow. Each of the clients attached to a stream can receive and play back the same commercial while data for the stream is buffering at startup. Alternatively, different clients can receive and play back different commercials that are customized for the respective clients. Or, instead of playing at startup, commercials can play back at interruptions in playback (e.g., for bitrate switching, for stream collapsing, or at planned interruptions). The server can aggregate streams for commercials just like primary media streams.

The state diagrams in FIGS. 8A-8E and 9A-9B can be expanded to support additional or more complex functionalities including enhanced error control, support for multiple simultaneous download streams, and other advanced features.

The techniques and tools described herein are not restricted to the on-demand distribution of movies or other time sensitive streaming and can be used to distribute non-media streaming, data or any set of files from a single server to a large number of receiving clients. Thus, the technologies described herein can be applied to the distribution of content, generally, rather than being limited to the distribution of media content. Further, a media service can use either the start time synchronization or stream merging approaches to reduce media streaming bandwidth, or it can use both approaches together.

By reducing media streaming bandwidth, content providers can reduce the cost of providing the content. For example, reducing media streaming bandwidth can reduce the need to invest in new content distribution facilities and reduce the need to upgrade or build new backbone pipes.

Any of the computer-executable instructions for implementing the disclosed techniques as well as any data created and used during implementation of the disclosed embodiments can be stored on one or more computer-readable media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other computing devices that include computing hardware). Computer-readable media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses.

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Having illustrated and described the principles of the illustrated embodiments, the embodiments can be modified in various arrangements while still remaining faithful to the concepts described above. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. A method of reducing media streaming bandwidth, the method comprising:
    receiving a plurality of first requests for media from a plurality of first clients during a first time interval;
    aggregating the plurality of first requests as a first batch;
    starting streaming the media to the plurality of first clients via a first stream;
    receiving a plurality of second requests for the media from a plurality of second clients during a second time interval;
    aggregating the plurality of second requests as a second batch;
    starting streaming the media to the plurality of second clients via a second stream that is temporally offset from the first stream;
    determining whether streaming the media to the plurality of first clients via the second stream in place of the first stream will not disrupt playback of the media at the plurality of first clients, the determining comprising determining whether the plurality of first clients has sufficient media stored locally; and
    if so, collapsing the first stream by:
    switching the plurality of first clients from the first stream to the second stream; and
    ending the first stream.

2. The method of claim 1, the starting streaming the media to the plurality of first clients via the first stream occurring after the number of the plurality of first requests meets a request threshold.

3. The method of claim 1, the first time interval being a fixed time interval, the starting streaming the media to the plurality of first clients occurring after the first time interval expires.

4. The method of claim 1, the first stream and the second stream being started on a periodic basis.

5. The method of claim 1, the method further comprising:
    starting streaming the media to the plurality of third clients via a third stream;
    receiving a request from at least one of the plurality of second clients to receive the media at a bit rate different than a bit rate of the second stream; and
    if streaming the media to the at least one of the plurality of second clients via the third stream satisfies the request, switching the at least one of the plurality of second clients to the third stream; otherwise:
    starting a new stream that satisfies the request; and
    streaming the media to the at least one of the plurality of second clients via the new stream.

6. The method of claim 1, further comprising:
    receiving a plurality of additional requests for the media from a plurality of additional clients during an additional time interval;
    aggregating the plurality of additional requests as an additional batch; and
    starting streaming the media to the plurality of additional clients via an additional stream, wherein the additional stream is temporally offset from the first stream and the second stream.

7. At least one computing device programmed to carry out a method, the method comprising:
    starting streaming media to a first client via a first stream;
    starting streaming the media to a second client via a second stream that is temporally offset from the first stream, wherein a number of different streams, including the first and second streams, are concurrently streamed;
    determining whether the first client can be switched from the first stream to the second stream without disrupting playback of the media at the first client, the determining comprising determining whether the first client has sufficient media stored locally to switch from the first stream to the second stream without disruption of playback;
    if so, collapsing the first stream by:
    switching the first client from the first stream to the second stream so as to reduce the number of different streams concurrently being streamed for the media; and
    ending the first stream;
    starting streaming the media to a third client via a third stream that is temporally offset from the first and second streams;
    determining whether the first and second clients can be switched from the second stream to the third stream; and
    if so, switching the first and second clients from the second stream to the third stream.

8. The at least one computing device of claim 7 wherein the switching the first client from the first stream to the second stream includes:
    discontinuing the streaming the media to the first client via the first stream; and
    starting the streaming the media to the first client via the second stream.

9. The at least one computing device of claim 7, the switching the first client from the first stream to the second stream comprising:
    instructing the first client to discontinue receiving the media via the first stream; and
    instructing the first client to begin receiving the media via the second stream.

10. The at least one computing device of claim 7, the switching the first client to the second stream comprising:
    reducing a bit rate of the first stream; and
    when the first stream is synchronized with the second stream:
    instructing the first client to discontinue receiving the media via the first stream; and
    instructing the first client to begin receiving the media via the second stream.

11. The at least one computing device of claim 7, the second stream having been started after the first stream.

12. One or more computer-readable storage media storing computer-executable instructions for causing a computing device to perform a method, the method comprising:
    initiating delivery of media, via one or more streams, to clients requesting the media, each of the one or more streams being sent to clients requesting the media within a time period, a stream being started if the media has been requested by at least one client during the time period, the one or more streams comprising a first stream for delivering the media to one or more first clients requesting the media during a first time interval and a second stream for delivering the media to one or more second clients requesting the media during a second time interval, the first and second time intervals being temporally offset from each other;

determining whether the one or more first clients can be switched from the first stream to the second stream without disrupting playback of the media at the one or more first clients, the determining comprising determining whether the one or more first clients have sufficient media stored locally to switch from the first stream to the second stream without disruption of playback;

If so, collapsing the first stream by:
  instructing the one or more first clients to receive the media via the second stream in place of the first stream; and
  ending the first stream;
  wherein the one or more streams further comprise a third stream for delivering the media to one or more third clients requesting the media during a third time interval, the third time interval being temporally offset from the first and second time intervals, the method further comprising:
  instructing the one or more first clients and the one or more second clients to receive the media via the third stream in place of the second stream.

13. The one or more computer-readable storage media of claim 12, the one or more streams starting on a periodic basis.

\* \* \* \* \*